United States Patent [19]

Nomura

[11] Patent Number: 5,103,317

[45] Date of Patent: Apr. 7, 1992

[54] APPARATUS FOR PLAYING RECORDING MEDIUM HAVING A SELECTIVE SPECIAL REPRODUCTION PLAYBACK MODE

[75] Inventor: Satoru Nomura, Yamanashi, Japan

[73] Assignees: Pioneer Electronic Corporation, Tokyo; Pioneer Video Corporation, Yamanashi, both of Japan

[21] Appl. No.: 345,421

[22] Filed: Apr. 24, 1989

[30] Foreign Application Priority Data

Apr. 25, 1988 [JP] Japan ................ 63-102181
Apr. 25, 1988 [JP] Japan ................ 63-102182

[51] Int. Cl.$^5$ ............................................. H04N 5/91
[52] U.S. Cl. .................................. 358/335; 358/341; 358/342; 369/32; 369/50; 369/54
[58] Field of Search ............... 358/310, 312, 313, 327, 358/335, 341, 342; 360/10.1, 14.1, 18; 369/32, 47, 48, 50, 54, 58, 124; 340/703, 723, 747

[56] References Cited

U.S. PATENT DOCUMENTS

| | | | |
|---|---|---|---|
| 4,697,176 | 9/1987 | Kawakami | 358/310 X |
| 4,761,692 | 8/1988 | Yoshida et al. | 369/50 X |
| 4,885,644 | 12/1989 | Ishii et al. | 358/342 |
| 4,953,035 | 8/1990 | Yoshio | 358/335 |
| 4,989,097 | 1/1991 | Yoshio et al. | 358/335 |
| 4,992,885 | 2/1991 | Yoshio | 358/342 X |
| 4,992,886 | 2/1991 | Klappert | 358/342 |
| 5,010,417 | 4/1991 | Yoshio et al. | 358/335 |

FOREIGN PATENT DOCUMENTS 56-102182 8/1981 Japan .

*Primary Examiner*—Roy N. Envall, Jr.
*Assistant Examiner*—W. R. Young
*Attorney, Agent, or Firm*—Fleit, Jacobson, Cohn, Price, Holman & Stern

[57] ABSTRACT

An apparatus for playing a recording medium on which, in addition to a coded information signal, graphic codes including picture information are recorded as being inserted as subcodes into the coded information signal, includes a pickup for reading information recorded on the recording medium and a graphic code detection device generating a graphic code detection signal when the presence of graphic codes in the read signal of the pickup is detected. The apparatus further includes a device for inhibiting a special reproduction operation of the apparatus by which information recorded on the recording medium in an order different from a recording order by a track jump operation of an information reading point of the pickup, when the graphic code detection signal is present.

4 Claims, 25 Drawing Sheets

Fig. 10

| TCB | MODE | SUBCODE PICTURE | MOTION PICTURE |
|---|---|---|---|
| 0 0 | TRANSPARENT MODE | 0 % | 100 % |
| 1 0 | MIXING MODE | M % | (100-M) % |
| 1 1 | NON-TRANSPARENT MODE | 100 % | 0 % |

Fig. 5

| SYMBOL | R | S | T | U | V | W |
|---|---|---|---|---|---|---|
| 0 | 0 | 0 | 1 | 0 | 0 | 1 |
| 1 | 0 | 1 | 1 | 1 | 1 | 0 |
| 2 | PARITY Q ||||||
| 3 | ||||||
| 4 | COLOR 0 ||||||
| 5 | ||||||
| 6 | ⋮ ||||||
| 17 | ||||||
| 18 | COLOR 7 ||||||
| 19 | ||||||
| 20 | PARITY P ||||||
| ⋮ | ||||||
| 23 | ||||||

Fig. 4

| SYMBOL | R | S | T | U | V | W |
|---|---|---|---|---|---|---|
| 0 | 0 | 0 | 1 | 0 | 0 | 1 |
| 1 | 0 | 0 | 0 | 1 | 1 | 0 |
| 2 | PARITY Q ||||||
| 3 | ||||||
| 4 | CHANNEL | | COLOR 0 ||||
| 5 | CHANNEL | | COLOR 1 ||||
| 6 | 0 | ROW |||||
| 7 | COLUMN ||||||
| 8 | FONT ||||||
| ⋮ | ||||||
| 19 | ||||||
| 20 | PARITY P ||||||
| ⋮ | ||||||
| 23 | ||||||

| Fig. 6A | Fig. 6B |
| | Fig. 6C |

Fig. 8

| MODE | ITEM | |
|---|---|---|
| 0 0 0 | 0 0 0 | ZERO MODE |
| 0 0 1 | 0 0 0 | LINE-GRAPHICS MODE |
| 0 0 1 | 0 0 1 | TV-GRAPHICS MODE |
| 0 0 1 | 0 1 1 | GRAPHICS MODE WITH MOTION PICTURE |
| 1 1 1 | 0 0 0 | USER'S MODE |

Fig. 9

| SYMBOL | R | S | T | U | V | W |
|---|---|---|---|---|---|---|
| 0 | 0 | 0 | 1 | 0 | 1 | 1 |
| 1 | 0 | 1 | 1 | 1 | 0 | 0 |
| 2 | PARITY Q | | | | | |
| 3 | | | | | | |
| 4 | TCB-0 | | TCB-1 | | TCB-2 | |
| 5 | TCB-3 | | TCB-4 | | TCB-5 | |
| 6 | TCB-6 | | TCB-7 | | TCB-8 | |
| 7 | TCB-9 | | TCB-10 | | TCB-11 | |
| 8 | TCB-12 | | TCB-13 | | TCB-14 | |
| 9 | TCB-15 | | 0 | 0 | 0 | 0 |
| 10 | 0 | 0 | 0 | 0 | 0 | 0 |
| ⋮ | | | | | | |
| 19 | 0 | 0 | 0 | 0 | 0 | 0 |
| 20 | PARITY P | | | | | |
| ⋮ | | | | | | |
| 23 | | | | | | |

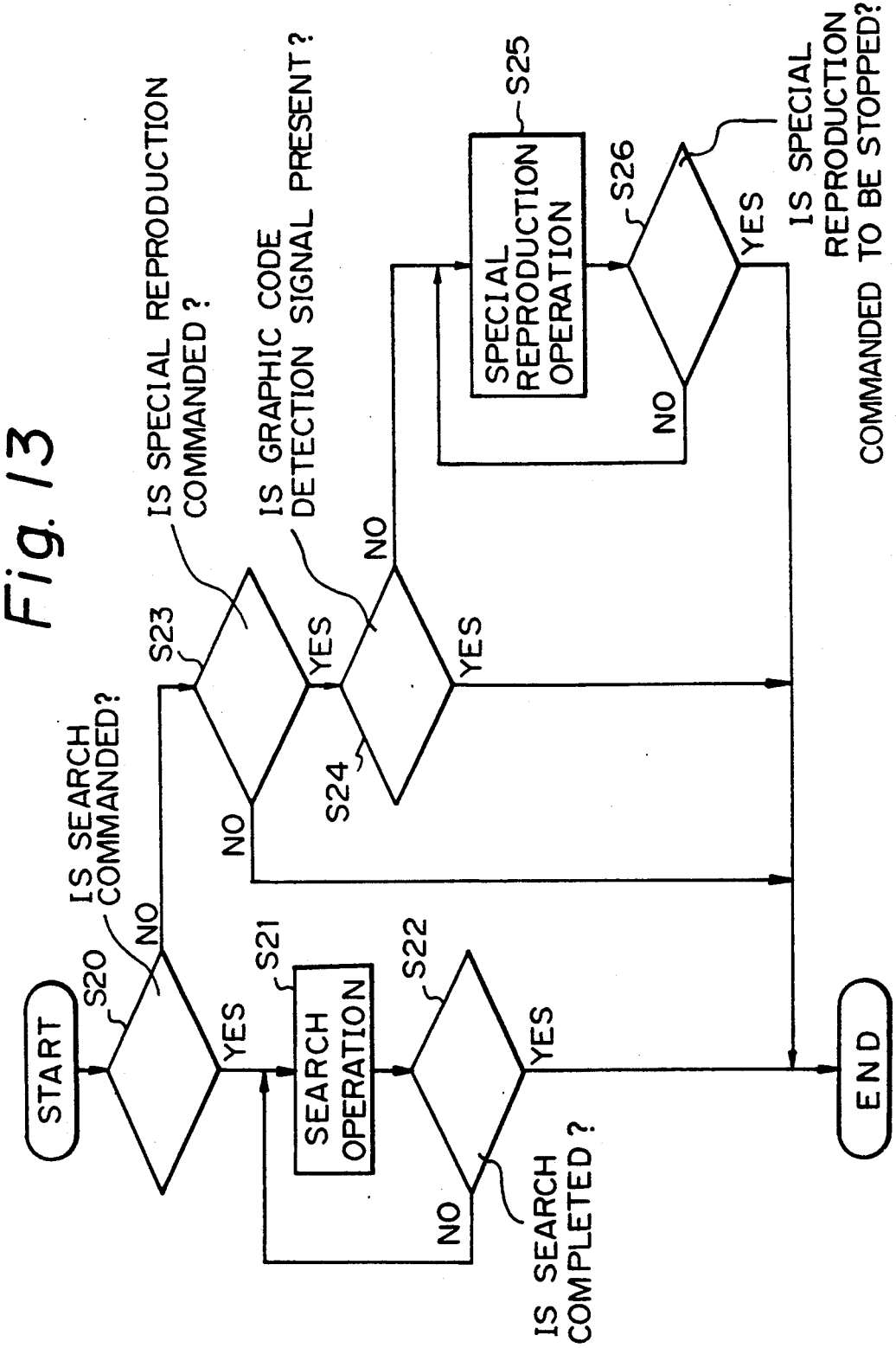

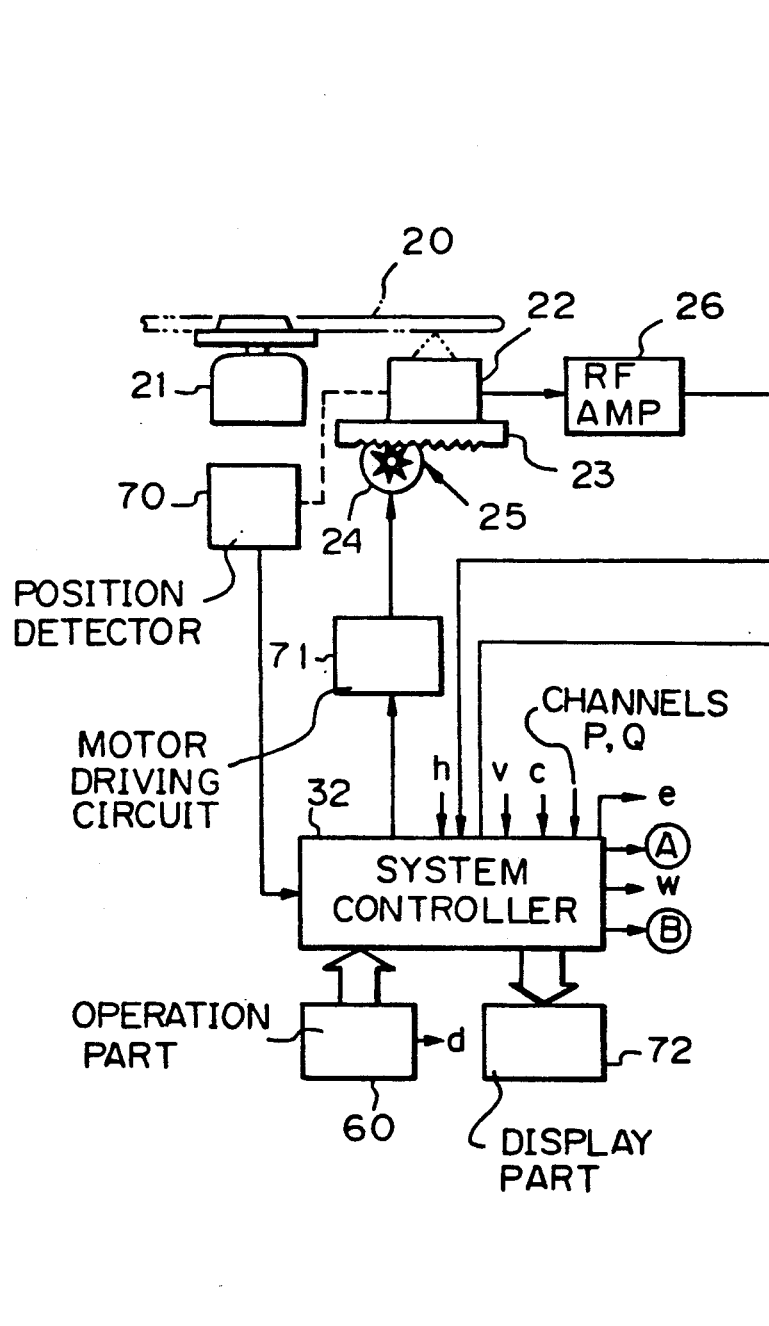

Fig. 17

| SYMBOL | R | S | T | U | V | W |
|---|---|---|---|---|---|---|
| 0 | 0 | 0 | 1 | 0 | 0 | 1 |
| 1 | 0 | 0 | 0 | 0 | 0 | 1 |
| 2 | \multicolumn{6}{c}{PARITY Q} |
| 3 | | | | | | |
| 4 | 0 | 0 | \multicolumn{4}{c}{COLOR} |
| 5 | 0 | 0 | \multicolumn{4}{c}{REPEAR} |
| 6 | 0 | 0 | 0 | 0 | 0 | 0 |
| ⋮ | | | | | | |
| 19 | 0 | 0 | 0 | 0 | 0 | 0 |
| 20 | \multicolumn{6}{c}{PARITY P} |
| ⋮ | | | | | | |
| 23 | | | | | | |

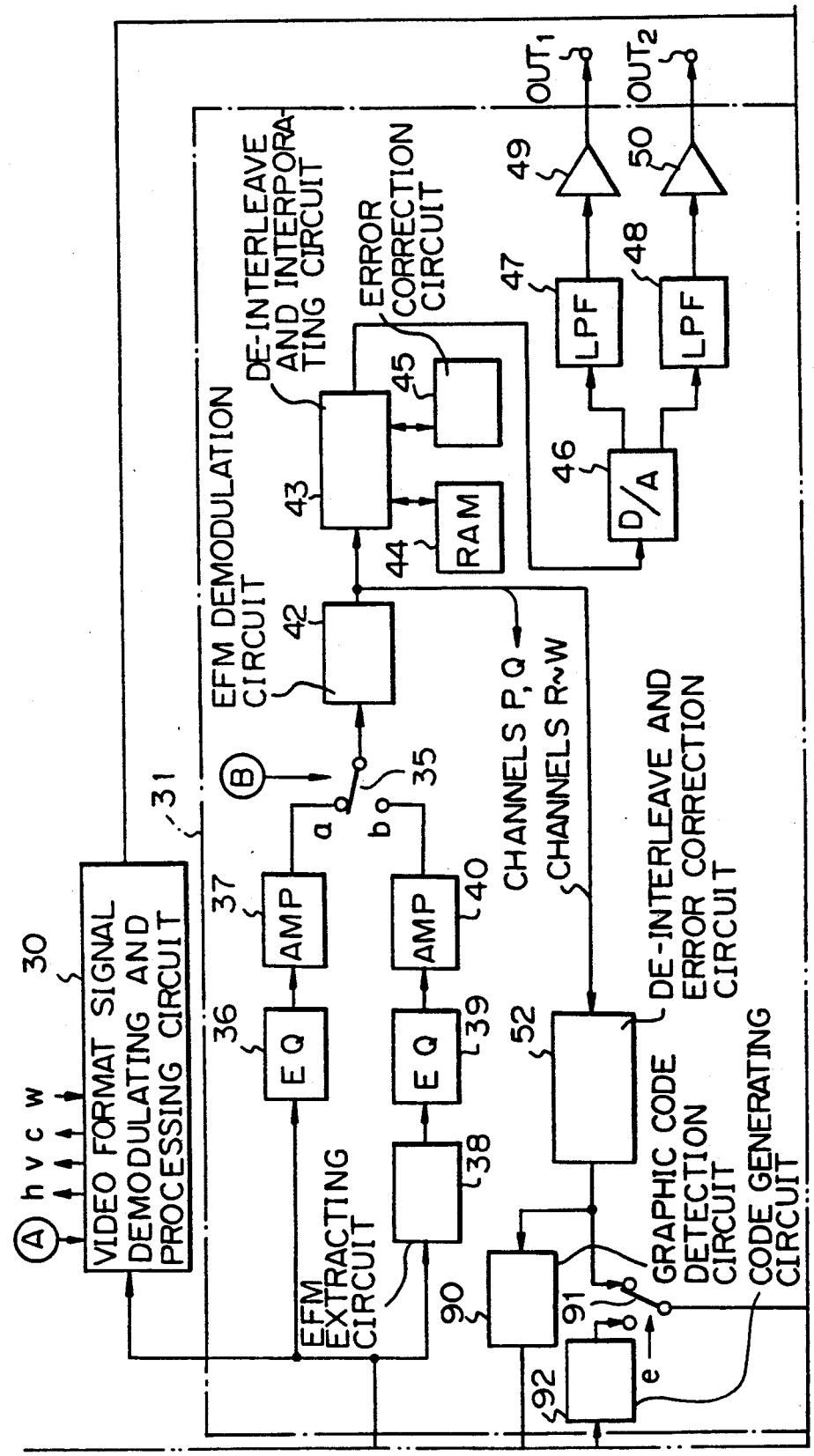

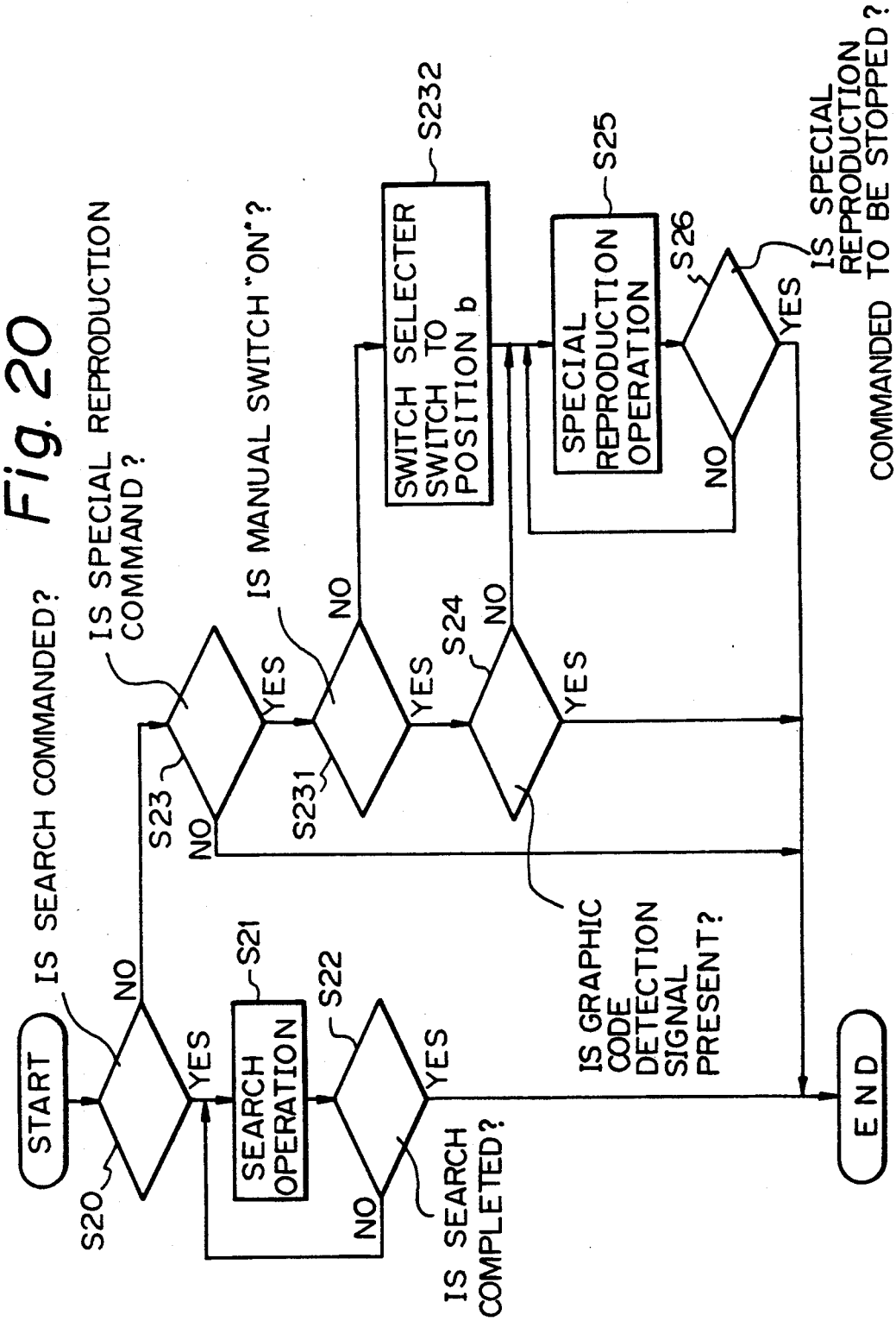

Fig. 21A
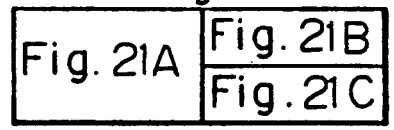
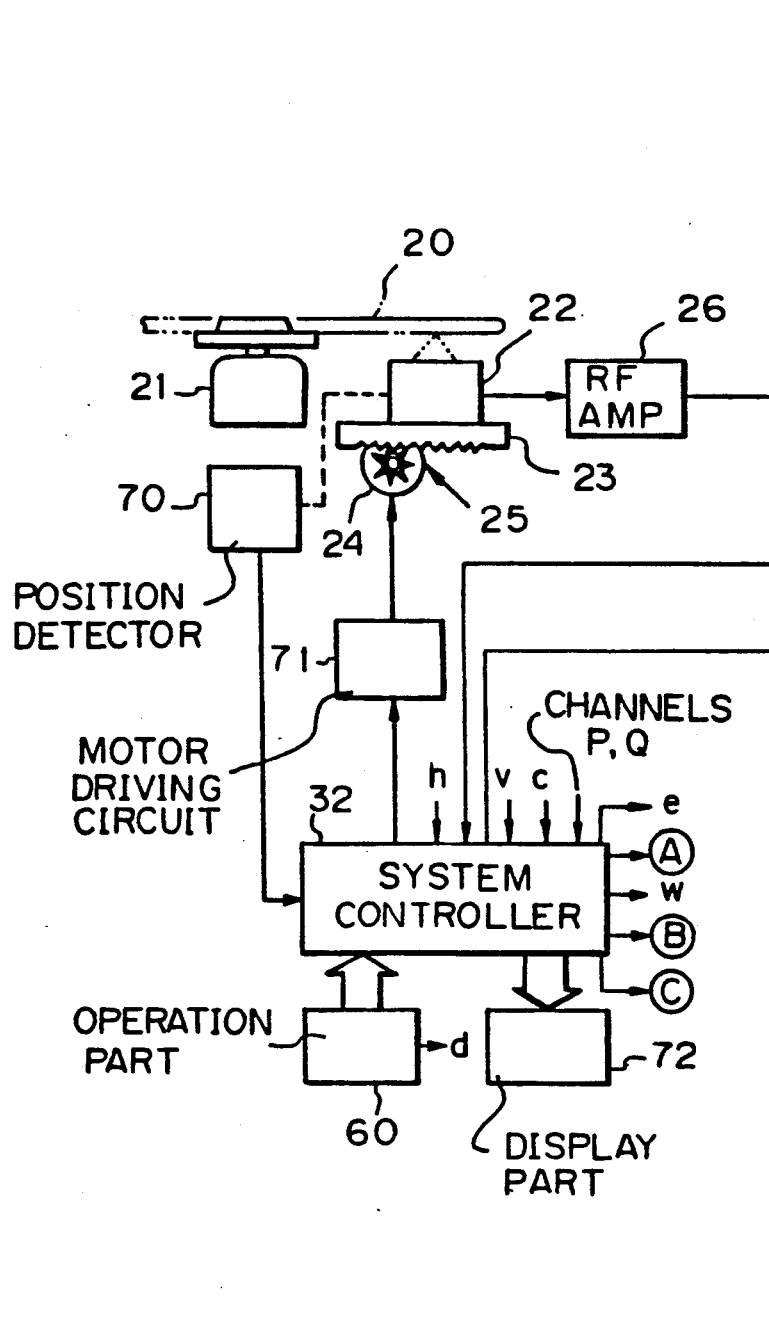

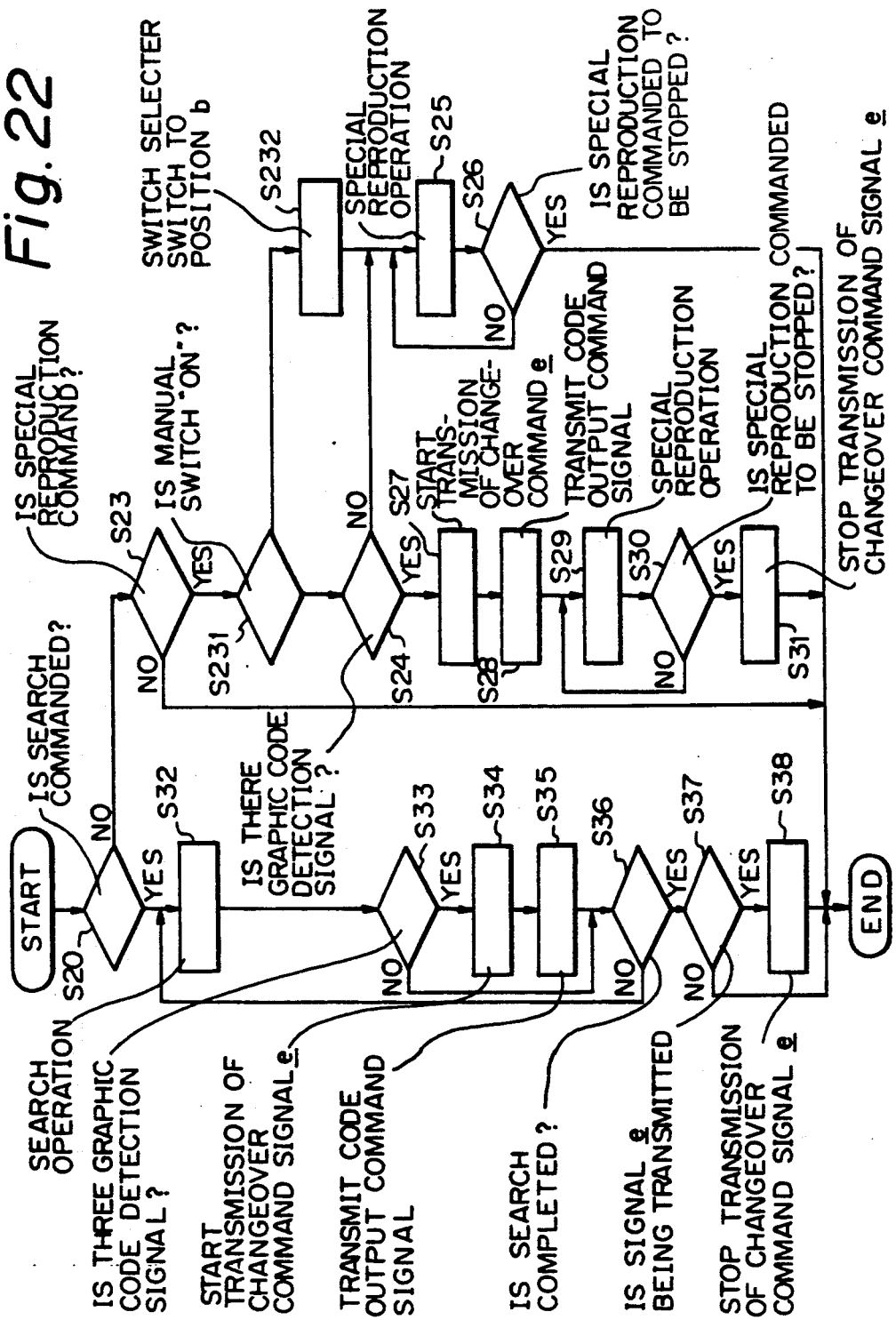

APPARATUS FOR PLAYING RECORDING MEDIUM HAVING A SELECTIVE SPECIAL REPRODUCTION PLAYBACK MODE

BACKGROUND OF THE INVENTION

1. Field of the Invention

The present invention relates to recording medium playing apparatus, such as a disc player for playing a video disc or a digital audio disc.

2. Description of Background Information

There has been proposed a system for recording and reproducing picture information in the form of the subcode, on and from a digital audio disc having a diameter of 12 cm, generally called compact disc (abbreviated as CD hereinafter). The subcode is made up of eight subcode bits, and bit groups forming the subcode are divided into eight channels denoted by letters P, Q, R, S, T, U, V, and W respectively. In the method in which the picture information is recorded and reproduced in the form of the subcode, data corresponding to picture information is configured such that a symbol is formed by 6 bits of channels R through W from among the 8 bits forming the subcode, and 98 symbols are treated as one block, as illustrated in FIG. 1. Two symbols in the 98 symbols are used as a sync signal, and 24 symbols obtained by dividing the remaining 96 symbols by four are treated as a minimum unit of data, i.e. a "pack", which constitutes one instruction of the picture processing.

More specifically, the first symbol (referred to as symbol 0 hereinafter) of the 24 symbols shows one of several modes. A symbol 1 following this symbol 0 is "instruction" which indicates the sort of the instruction. Symbols 2 and 3 following the symbol 1 constitute a parity Q which is an error correction code. Symbols 4 through 19 following the parity Q constitute a data field, and include information such as color information. Finally, symbols 20 through 23 following the data field constitute a parity P which is an error correction code for protecting the information in the "pack".

On the other hand, there are four modes, i.e. "zero mode", "line-graphics mode", "TV-graphics mode", and "user's mode". The "zero mode" is provided for a case where no operation is required for pictures on the display screen, that is, pictures are to be maintained as they are, and all data in the "pack" are 0 for this mode.

The "line-graphics mode" is provided for such a case that a liquid crystal display is provided on the front face of the player, to display notes such as an explanation of a music selection. As shown in FIG. 2, a picture area elongated sideways is formed by pixels which are arranged in 288 columns and 24 rows. In other words, each row includes 288 pixels and each column includes 24 pixels. The term "pixel" means the minimum display element of a picture, and it is general that the picture processing is performed by using picture composing units designated as "fonts" each of which is made up of pixels divided into 6 columns and 12 rows.

The number of "fonts" which can be displayed in the "line-graphics mode" is 48 in the lateral direction, and 2 in the column direction, and this area is designated as "screen area". For providing the scroll function, a line of "fonts" is added to the upper and lower outer peripheries and the right and left peripheries of the "screen area", to form a picture area having 50 "fonts" in the row direction, and 4 "fonts" in the column direction. The subcode is formed so that the picture processing is performed by using a memory having addresses each corresponding to each pixel in this picture area. In addition, the area outside the "screen area" is designated as "border".

The "TV-graphics mode" is a mode for displaying images on the TV screen, and a picture is formed by pixels arranged in 192 rows and 288 columns as illustrated in FIG. 3. The number of "fonts" which can be displayed in the "TV-graphics mode" is 48 in the direction of row, and 16 in the direction of column. Also in this "TV-graphics mode", the subcode is formed so that the picture processing is performed by using a memory having addresses each of which corresponds to each pixel in a picture area having 50 "fonts" in the direction of row, and 18 "fonts" in the direction of column, made by adding a line of "fonts" to the upper and lower peripheries as well as the right and left outer peripheries of the "screen area".

As instructions for the picture processing, there is an instruction for painting out the whole picture area by one certain color, an instruction for drawing a picture in one "font" on the screen by using two different colors, an instruction for moving the whole picture upward, downward, or sideways, and so on.

Additionally, in the 8-bit groups forming the subcode, the Q bits forming the channel Q include time information corresponding to the track length to a certain position of each information data which is recorded from the beginning of the program area of CD, and form address time data which can be used as positional data representing the recording position. On the other hand, the P bits forming the channel P provide data including information relating to a pause between two music selections.

The system of recording and reproducing picture information as the subcode explained above is constructed so that as many as sixteen picture channels can be designated at maximum. Specifically, a "write font foreground/back-ground" instruction is used in the "TV-graphics mode", which has such a structure as illustrated in FIG. 4. This is an instruction for writing font data of the symbols 8 through 19 in positions having a row address defined by the symbol 6 and a column address defined by the symbol 7. For the pixels whose font data is "0", a color of a color number determined by the "color 0" is designated as a background color. For the pixels whose font data is "1", a color of a color number defined by "color 1" is designated as a foreground color. At the same time, sub-picture channels can be designated by using four bits of the channels R and S of the symbols 4 and 5. By this feature, as many as sixteen picture channels can be designated. Sixteen sorts of picture are previously recorded on a disc for example, and a desired picture channel can be selected on the playing side at the time of playing by this scheme of designating the picture channel.

In addition, there are numbers from "0" to "15" as color numbers. Sixteen colors indicated by the color number "0" through "15" are set by a "load CLUT color 0 through color 15 (load color look-up table color 0 through color 15)" instruction. The "load CLUT color 0 through color 15" instruction is an instruction having a structure illustrated in FIG. 7, and setting the contents of a color look-up table showing the color of pre-set color numbers or foreground/background color numbers. It is necessary to designate sixteen colors in total. However, since four bits are used respectively for each of RGB to indicate a color, two symbols are required for setting one color. Therefore, eight colors are set by one "pack" at most. With these circumstances, the instruction is divided into two instructions respectively designating eight colors of the first half, and eight colors of the second half.

The instruction code for the colors of the first half, i.e. the color 0 through the color 7, is determined to be "30", and the instruction code for the colors of the second half, i.e. the color 8 through color 15 are determined to be "31". The mixing of colors for each of the color numbers is as follows. Red color is represented by four bits of the channels R through U of even symbols allotted to the color number. Green color is represented by four bits, i.e. two bits of the channels V and W following the channels R through U of the even symbols, and two bits of the channels R and S of odd symbols. Blue color is represented by four bits of channels T through W following the channels R and S of the odd symbols. Therefore, $2^4$ (=16) sorts of gray scales are available for each color, and preparation of $16^3$ (=4096) colors is possible since three colors (RGB) are used. In addition, a gray scale "0000" corresponds to the darkest state, and a gray scale "1111" corresponds to the brightest state.

In the system of recording and reproducing picture information as the subcode as explained above, the time period necessary for displaying a picture of one "font" is about 3.3/1000 second, and about 2.5 seconds are necessary for displaying 48×16 characters. This means that picture information of an amount corresponding to a picture can not be obtained until the pickup traces the recording track for about 2.5 seconds. Therefore, in the case of recording medium playing apparatuses for playing a recording medium on which picture information is recorded as the subcode according to the conventional method, there has been a problem that disorder would be generated in the reproduced picture if a track jump operation is performed while picture information forming a picture is being read, in response to a command for a special reproduction operation such as a double speed reproduction operation which is performed by reproducing the recorded information in an order different from the order of recording, using the track jump operation for moving the information detection point of the pickup.

It to be noted that the "special reproduction operation" mentioned above does not include what is called a search operation, such as the chapter search operation.

OBJECT AND SUMMARY OF THE INVENTION

The present invention is based on the recognition of the problem described above and an object of the present invention is therefore to provide a recording medium playing apparatus in which disorder of the picture produced from the subcode can be surely prevented also when the execution of a special reproduction operation is commanded.

In order to attain the above described object, a recording medium playing apparatus according to the present invention is configured such that a graphic code detection signal is generated when a graphic code is detected in the read signal of the pickup for reading information recorded on the recording medium, and the special reproduction operation is inhibited during the presence of the graphic code detection signal.

According to another aspect of the present invention, a recording medium playing apparatus is configured such that a graphic code detection signal is generated when a graphic code is detected in the read signal of the pickup for reading information recorded on the recording medium, the contents of memory in which graphic codes in the read signal of the pickup are to be written are protected by putting them in a state irrelevant to the read signal if the graphic code detection signal is present upon initiation of the special reproduction operation, and a picture signal corresponding to graphic codes read out from memory is generated.

BRIEF DESCRIPTION OF THE DRAWINGS

FIG. 4 is a diagram showing the construction of "write font foreground/background" instruction;

FIG. 5 is a diagram showing "load color look-up table color 0 through, color 7" instruction;

FIG. 8 is a diagram showing the sort of recording modes in the method according to the present invention;

FIG. 9 is a diagram showing the construction of "load transparency control table";

FIG. 10 is a diagram showing the correspondency between the bit pattern of TCB and the mixing ratio;

FIGS. 12 and 13 are flowcharts showing the operation of processor in the system controller 32 of the apparatus shown in FIGS. 6A through 6C;

FIGS. 16A through 16C, when combined, are a block diagram of a recording medium playing apparatus as the second embodiment of the present invention;

FIG. 16 is a diagram showing the arrangement of FIGS. 16A through 16C;

FIG. 17 is a diagram showing the construction of "pre-set memory" instruction;

FIGS. 19A through 19C when combined, are a block diagram showing a variation of the recording medium playing apparatus according to the present invention;

FIG. 19 is a diagram showing the arrangement of FIGS. 19A through 19C;

FIG. 20 is a flowchart showing the operation of processor in the system controller 32 of the apparatus shown in FIGS. 19A through 19C;

FIGS. 21A through 21C, when combined, are a block diagram showing another variation of the recording medium playing apparatus according to the present invention;

FIG. 21 is a diagram showing the arrangement of FIGS. 21A through 21C; and

FIG. 22 is a flowchart showing the operation of processor in the system controller 32 of the apparatus shown in FIGS. 21A through 21C.

DETAILED DESCRIPTION OF PREFERRED EMBODIMENTS

Embodiments of the apparatus according to the present invention will be explained with reference to FIGS. 6 through 18 of the accompanying drawings.

Figure 1:
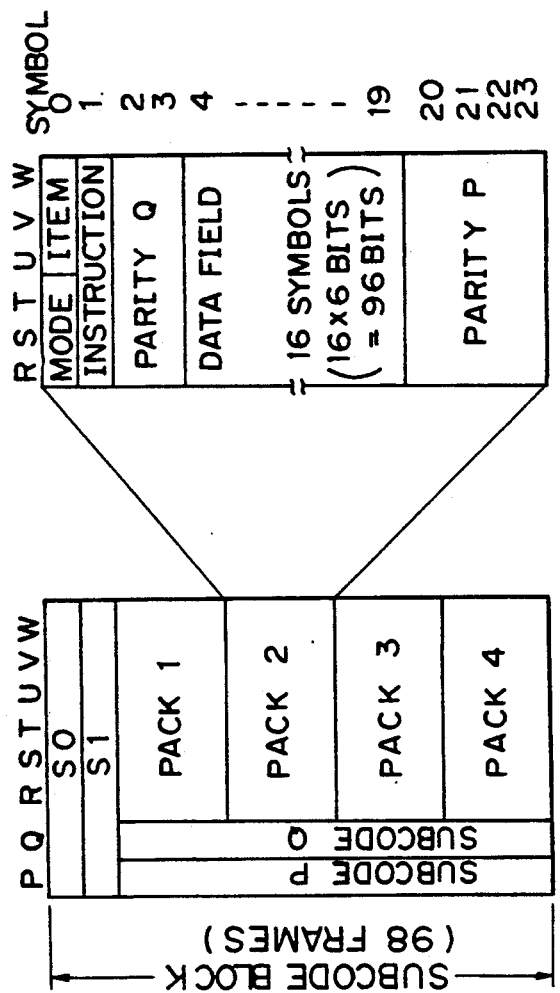
FIG. 1 is a diagram showing the recording format of the subcode.
Figure 2:
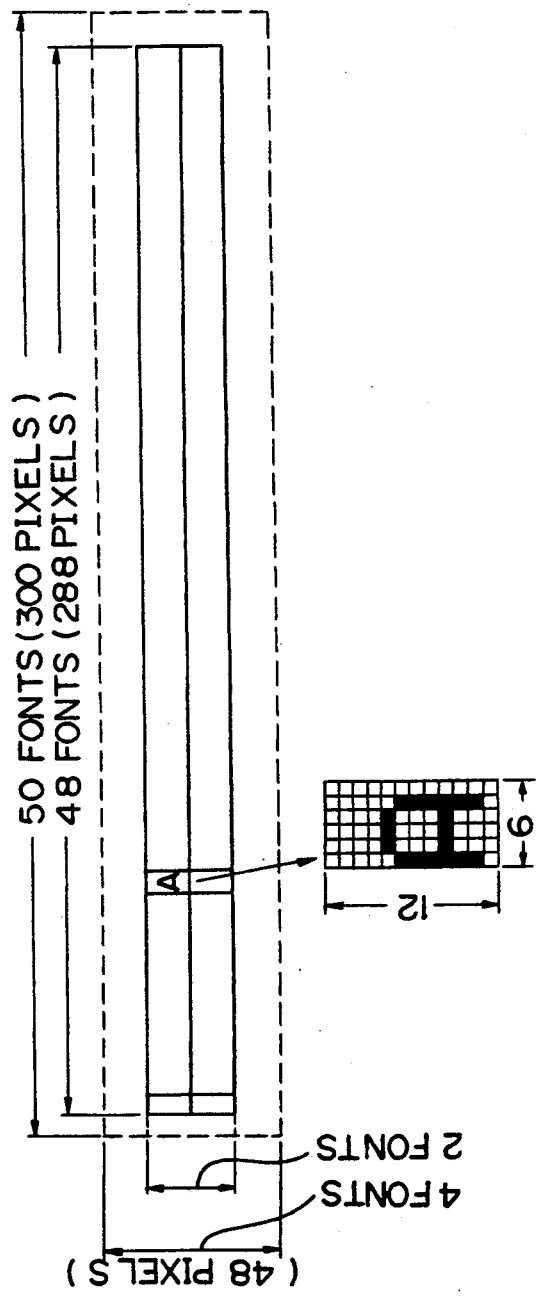
FIG. 2 is a diagram showing the structure of picture in the "line-graphics mode"
Figure 3:
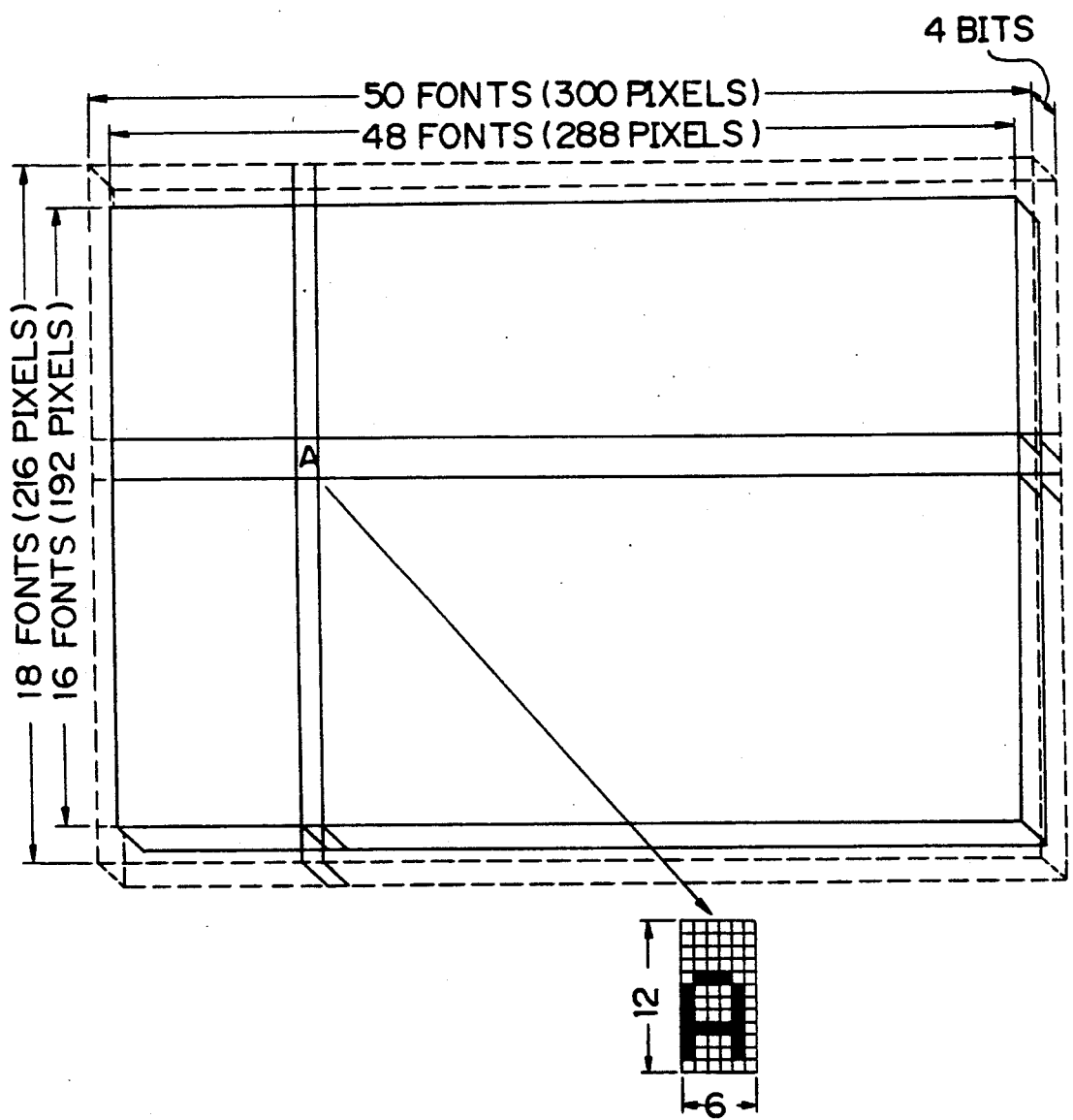
FIG. 3 is a diagram showing the structure of picture in the "TV-graphics mode"
Figures 6, 6A:
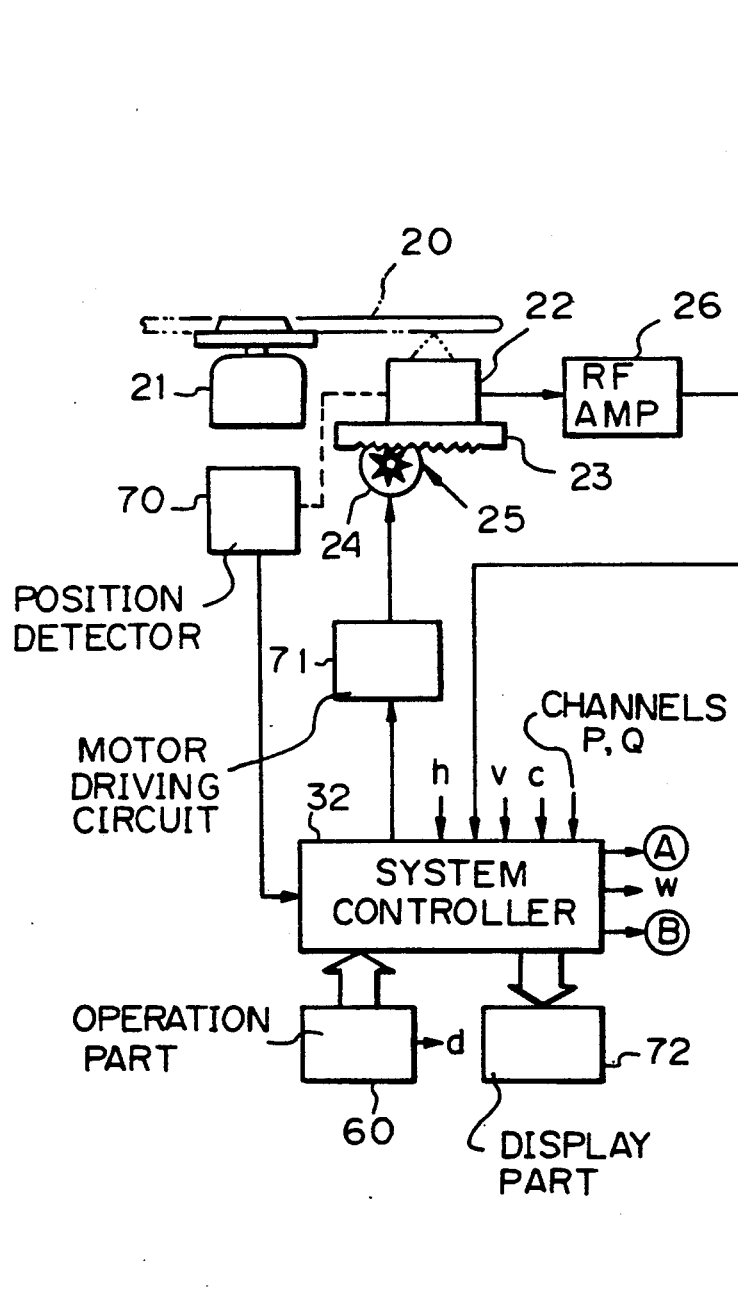
FIGS. 6A through 6C, when combined, are a block diagram showing a recording medium playing apparatus as the first embodiment of the present invention.
FIG. 6 is a diagram showing the arrangement of FIGS. 6A through 6C.

As shown in FIG. 6A, a disc 20 is driven to rotate by a spindle motor 21 and information recorded thereon is read by means of an optical pickup 22.

Figure 7:
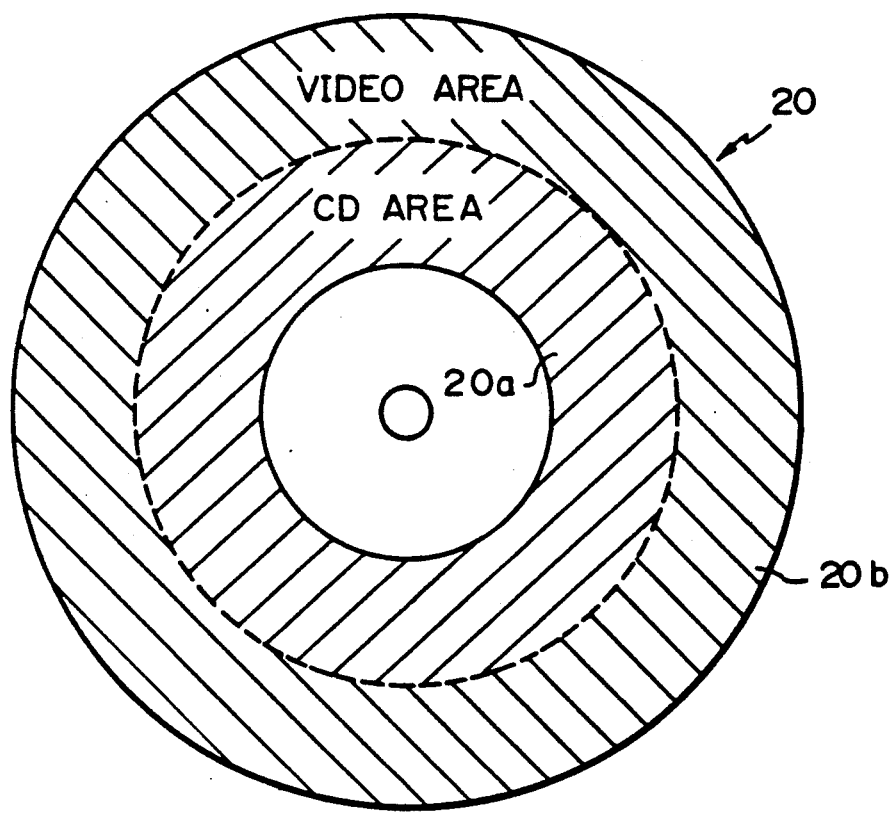
FIG. 7 is a diagram showing recording area of a composite disc.

The disc 20 is a composite disc as illustrated in FIG. 7. As shown, the composite disc 20 has a first area 20a disposed in an inner peripheral area of the disc (this area being referred to hereinafter as the CD area) in which is recorded a digital audio signal with the subcode including picture information being inserted, and a second recording area 20b (this area being referred to hereinafter as the video area) containing an FM-modulated video format signal and a superimposed digital audio signal with the subcode including picture information being inserted, wherein the superimposition operation is performed by using a frequency multiplexing system. Since the video format signal contains higher frequency components than the PCM signal, it is necessary to rotate the disc at a higher speed of rotation during the recording of signals in the video area 20b, than during the recording of the signal in the CD area 20a. Therefore of course it is necessary, in the playing time, to reproduce the signal by rotating the disc at the higher speed during the playback of video area 20b, than during the playback of CD area 20a. The speed of disc rotation during the playback of CD area 20a is several hundred r.p.m., whereas during the video area playback the speed of rotation is two thousand plus several hundred r.p.m. for playback from the innermost periphery of that area, and is one thousand plus several hundred r.p.m. for playback from the outermost periphery of that area, so that the speed of rotation is extremely high during video area playback.

In the head portions of the CD area 20a and the video area 20b, there respectively are provided a lead-in area in which are recorded, as the subcode, index codes relating to the contents recorded in each area, such as first and second code groups formed correspondingly to each area by the repetition of index codes which respectively indicate start and end times of small portions which together constitute each area. In addition, the index codes of the audio lead-in area include information showing whether the disc itself is a composite disc or a disc of other type.

In order that picture by the FM-modulated video format signal and picture by the subcode are displayed on a single picture at the same time, the applicant has separately proposed a system in which a code to be inserted as the symbol 0 is set in order to designate an additional mode, that is, "graphic mode with motion picture" as illustrated in FIG. 8, in addition to the "zero mode" the "line-graphics mode", the "TV-graphics mode" and the "user's mode" which are also used in conventional methods.

The structure of picture in the "graphics mode with motion picture" is identical with that in the "TV-graphics mode", and an instruction designated as "load transparency control table" having the structure shown in FIG. 9 is provided. This "load transparency control table" instruction is an instruction for designating the mode for each pixel in picture area. Three modes are designated by this instruction, and those are namely, "transparent mode", "mixing mode", and "non-transparent mode". In these three modes, different values are selected for the mixing ratio between a video format signal obtained by the subcode and a video format signal which is recorded by a multiplexing operation together with the coded information signal including the subcode.

The bits in the channels R through W of each of the symbols 4 through 8 and the channels R and S of the symbol 9 constitute a series of codes TCB-0 through TCB 15 which respectively designate one of modes which will be described later for each of the group of pixels to which one of colors, which are registered as color number "0" through color number "15", is allotted. FIG. 10 shows the relationship between bit patterns of the codes TCB-0 through TCB-15 and the modes designating the mixing ratio, and the mixing ratio in each mode.

Turning again to FIG. 6, the pickup 22 for reading information recorded on the disc 20 incorporates therein an optical system including a laser diode, an objective lens, and photo detectors, a focus actuator for driving the objective lens in a direction of its optical axis with respect to the information recording surface of the disc 20, a tracking actuator for biasing the beam spot (information detecting point) issued from the pickup 22 with respect to the recording tracks in a direction of disc radius, and so on. The pickup 22 is mounted on a slider 23 which is linearly movable in the direction of disc radius by a drive of a transmission mechanism 25 which in turn has a slider motor 24 as a source of driving force, and made by a combination of rack and pinion gears. A read-out RF (radio frequency) signal outputted by the pickup 22 is supplied to a video format signal demodulating and processing circuit 30 and a coded information demodulating and processing circuit 31 through an RF amplifier 26.

The video format signal demodulating and processing circuit 30 includes a demodulation circuit which for example demodulates the RF signal and converts it to a video format signal and a memory which stores the video format signal after digitizing it, and configured to selectively output one of the video format signals outputted by the demodulation circuit and the video format signal read-out from the memory in accordance with a changeover command from a system controller 32. The video format signal outputted by the video format signal demodulating and processing circuit 30 is supplied to a video switch 33. In addition, the video format signal demodulating and processing circuit 30 is further provided with a separating circuit which separately extracts a horizontal sync signal h, a vertical sync signal v, and control data c from the demodulated video format signal, and the separated horizontal and vertical sync signals h and v, and the control data c are supplied to each part such as the system controller 32.

On the other hand, the coded information demodulating and processing circuit 31 is provided with a selector switch 35 which changes its switch position in accordance with the area to be played (the CD area or the video area) during the playing of a composite disc. The selector switch 35 is operated to a position a during the playing of the CD area, and to a position b during the playing of the video area, and the changeover is performed in response to a changeover command issued from the system controller 32. In the case of the composite disc, the speed of disc rotation changes extremely between the CD area and the video area, and the PCM audio signal is for example an EFM (Eight to Fourteen Modulation) signal. For the video area, the EFM signal would adversely affect on the low frequency component of the video signal treated by the FM modulation process if the digital signal is directly superimposed on the FM video signal at the time of recording. Therefore, the digital signal, i.e. the EFM signal is recorded at a level which is lower than the video carrier level by several tens of dB, although the degree of modulation is almost the same for the EFM and video signals. Thus the frequency characteristic and amplitude of a playback EFM signal will both be different, for the cases of CD area playback and video area playback respectively. However, a common demodulating system is used for the CD area playback and the video area playback. This is made possible by switching signal processing systems for the playback EFM signals of the CD area and the video area respectively.

Specifically, during playback of the CD area, the playback RF signal is an EFM signal, which is subjected to frequency characteristic compensation by an equalizer circuit 36 having a predetermined equalizing characteristic, and is amplified at a predetermined amplification factor by an amplifier 37. During the playing of the video area, on the other hand, the playback RF signal is an FM video signal which is combined with an EFM signal. The EFM signal is extracted by an EFM signal extracting circuit 38 which is made up of an LPF and so on, then is subjected to frequency characteristic compensation by an equalizer circuit 39, which has a different equalization characteristic from the equalizer circuit 36, to be then amplified by an amplifier 40, which has a higher gain than that of the amplifier 37. In this way, an EFM signal is derived whose frequency characteristic and amplitude are almost the same as the EFM signal obtained during CD area playback.

During playback of a CD disc, the selector switch 35 is held in position a.

The playback EFM signal selected by the selector switch 35 is supplied to an EFM demodulation circuit 42 which performs the demodulation process, to obtain a PCM data that is digital data including audio information of left and right channels which is for example time-division multiplexed, and the subcode. The digital data including audio information outputted by this EFM demodulation circuit 42 is supplied to a de-interleave and interpolating circuit 43. The de-interleave and interpolating circuit 43 is configured to change back, in cooperation with the RAM 44, the order of the digital data which was rearranged by the interleave operation during the recording, in turn send it to an error correction circuit 45, and to effect the interpolation of erroneous data in the output data of the error correction circuit 45 by the average value interpolation method for example, when a correction inability signal is outputted. The error correction circuit 45 is configured to perform the error correction operation by using the CIRC (Cross Interleave Reed Solomon Code), and supply the digital data to the de-interleave and interpolating circuit 43, or supply the digital data to the de-interleave and interpolating circuit 43 together with the correction inability signal when the error correction is not possible.

The output data of the de-interleave and interpolating circuit 43 is supplied to a D/A (Digital to Analog) converting circuit 46. The D/A converting circuit 46 includes a de-multiplexer which separates from each other the digital data of left and right-channel audio information combined by the time division multiplexing, and left and right-channel audio signals are reproduced. After their unnecessary components are removed at LPFs (Low Pass Filters) 47 and 48, the reproduced left and right-channel audio signals are supplied to audio output terminals $OUT_1$ and $OUT_2$ through amplifiers 49 and 50.

On the other hand, in the subcode outputted by the EFM demodulating circuit 42, two bits of the channels P and Q are supplied to the system controller 32, and six bits of the channels R through W are supplied to a de-interleave and error correction circuit 52 in which the de-interleave of the six bits of the channels R through W and the error correction using the parity Q and P are performed. Output data of the de-interleave and error correction circuit 52 is supplied to a mode/instruction decoder 53. The mode/instruction decoder 53 is configure to decode the mode represented by the three bits of the channels R through T of the symbol 0 of each pack, the mode designated by the "item" represented by the three bits of the channels U through W of the symbol 0 of each pack, and the instruction represented by the six bits of the channels R through W of the symbol 1 of each pack, and to supply to each part signals respectively indicative of the modes and the instruction. The output data of the de-interleave and error correction circuit also supplied to a graphic code detection circuit 90. The graphic code detection circuit 90 is configured to generate a graphic code detection signal upon detection of codes constituting the picture processing instruction from among output data of the de-interleave and error correction circuit 52. The output signal of the graphic code detection circuit 90 is supplied to the system controller 32.

Furthermore, the output data of the de-interleave and error correction circuit 52 is supplied to a picture memory device 55. The picture memory device 55 includes sixteen RAMs 56a through 56p having addresses respectively corresponding to all pixels on a picture having 50 "fonts" by 18 "fonts" in the row and column directions, and four bits of data can be stored in each address, and a memory control circuit 57 for sensing data indicating the color number of each pixel of each picture channels in the output data of the de-interleave and error correction circuit 52 by using the kind of the modes and the instruction indicated by the output of the mode/instruction decoder 53 and writing them in the corresponding addresses of the RAMs 56a through 56p, and for reading out sequentially in a predetermined order one memory content of the RAMs 56a through 56p corresponding to the picture channel designated by a data d by the key operation in an operation part 60 in accordance with horizontal and vertical sync signals h and v.

The data outputted by the picture memory device 55 is supplied to a color look-up table 58 (this table being referred to hereinafter as the CLUT). The CLUT 58 is configured to detect the "load CLUT color 0 through color 7" instruction and the "load CLUT color 8 through color 15" instruction from the output data of the de-interleave and error correction circuit 52 in accordance with the kind of the modes and the instruction indicated by the output signal of the mode/instruction decoder 53, and hold the color data corresponding to each color number, and configured to select and output color data of the color number designated by the data read-out from the picture memory 55.

The output data of this CLUT 58 is made up of three data respectively representing the level of one of the R, G, B color signals by using four bits. The three data outputted by the CLUT 58 and indicating the levels of the R, G, B color signals are supplied to D/A converting circuit 61, 62, and 63, and converted to analog signals. Output signals of these D/A converting circuits 61 through 63 are supplied to an analog-to-video converting circuit 65. The analog-to-video converting circuit 65 is configured, for example, to form a video signal of the NTSC system by the steps of obtaining a luminance signal and two color difference signals by the output signals of the D/A converting circuits 61 through 63, generating a color carrier signal by adding signals obtained by the parallel modulation of two color subcarrier signals having a phase difference of 90° by means of the two color difference signals, and combining the color carrier signal and the luminance signal by the summation, and adding sync signals thereto. By this analog-to-video converting circuit 65, the output signals of the D/A converting circuits 61 through 63 are converted to a video signal and transmitted subsequently.

In addition, the output data of the de-interleave and the error correction circuit 52 are also supplied to a transparency control table 66 (this table will be referred to as the TCT hereinafter). The TCT 66 is configured to detect a "load TCT" instruction in the output data of the de-interleave and error correction circuit 52 in accordance with the kind of the modes and instruction indicated by the output signal of the mode/instruction decoder 53, hold transparency control bits TCB-0 through TCB-15, and select one of the TCB-0 through TCB-15 being held, corresponding to a color number indicated by the data read-out from the picture memory device 55 and in turn output it.

The output signal of the TCT 66 is supplied to a video switch 33 as a control signal. In addition to the output signal of the TCT 66, the video format signal obtained from the subcode and outputted by the analog-to-video converting circuit 65, and the video format signal outputted by the video format signal demodulating and processing circuit 30 are supplied to the video switch 33.

In the video switch 33, the video format signal obtained from the subcode is supplied to a stationary contact x of the changeover switch 68, and also supplied to its stationary contact v through a resistor $R_1$. No connection is made to a stationary contact z of the changeover switch 68. The changeover switch 68 is configured to selectively output one of the signals supplied to its stationary contacts x, y, z by moving its movable contact u to be in contact with one of the stationary contacts x, v, z in accordance with a control signal issued from the TCT 66. The video format signal outputted from the video format signal demodulating and processing circuit 30 is directly supplied to a stationary contact z of a changeover switch 69 and also supplied to its stationary contact v through a resistor $R_2$. No connection is made to a stationary contact x of the changeover switch 69. The changeover switch 69, like the changeover switch 68, is configured to move its movable contact u to be in contact with one of its stationary contacts x, v, z in accordance with the control signal. The movable contacts u, u of the changeover switches 68 and 69 are mutually connected. A resistor $R_3$ is connected between a common junction J of the movable contacts u, u and ground. A mixed signal of the video format signal obtained from the subcode and the video format signal outputted from the video format signal demodulating and processing circuit 30 is derived at the common junction J. When the movable contacts u, u of the changeover switches 68 and 69 are in contact with the stationary contacts x, x respectively, the mixing ratio of the video format signal obtained from the subcode becomes 100%, and the mixing ratio is reduced to 0% when the movable contacts u, u are in contact with the stationary contacts z, z. When, on the other hand, the movable contacts z, z are in contact with the stationary contacts y, y, the mixing ratio is equal to M which is determined by the resistors $R_1$ and $R_2$, and the resistance of the resistors $R_1$ and $R_2$ are selected so that M has a value between 20% and 80%. The signal derived at the common junction J is supplied to a video output terminal $OUT_3$.

A position detector 70 is provided in the vicinity of the path of the movement of pickup 22 along the radial direction of a disc, and serves to detect when the beam spot emitted from the pickup 22 has reached a position corresponding to the vicinity of the boundary between the CD are and the video area of a composite disc, to produce a detection signal. By the generation of this detection signal, a state that the pickup 22 has reached the video area can be detected. The position detector 70 can be of a known structure including for example an optical sensor. The detection signal outputted by the position detector 70 is supplied to the system controller 32.

The system controller 32 comprises a microcomputer which consists of a processor, a ROM (read only memory), a RAM and so on. The system controller 32 is supplied with various signals and information such as the horizontal sync signal h, the vertical sync signal v, and the control data c, the P-channel and Q-channel bits in the subcode outputted from the EFM demodulation circuit 42, disc designation information from the control part 60 indicating whether the disc to be played is a compact disc or a composite disc, and mode designation information from the operation part 60, indicating whether the reproducing area is only the CD area or the video area, or both CD and video areas in the case of the playback of a composite disc.

In this system controller 32, the processor executes processing of the signals inputted in accordance with programs previously stored in the ROM, and performs the control operation of each part of the video format signal demodulating and processing circuit 30, the selector switch 35, a drive circuit (not shown) for driving the spindle motor 21, a motor drive circuit 71 for driving the slider motor, and the display part 72.

Figure 11:
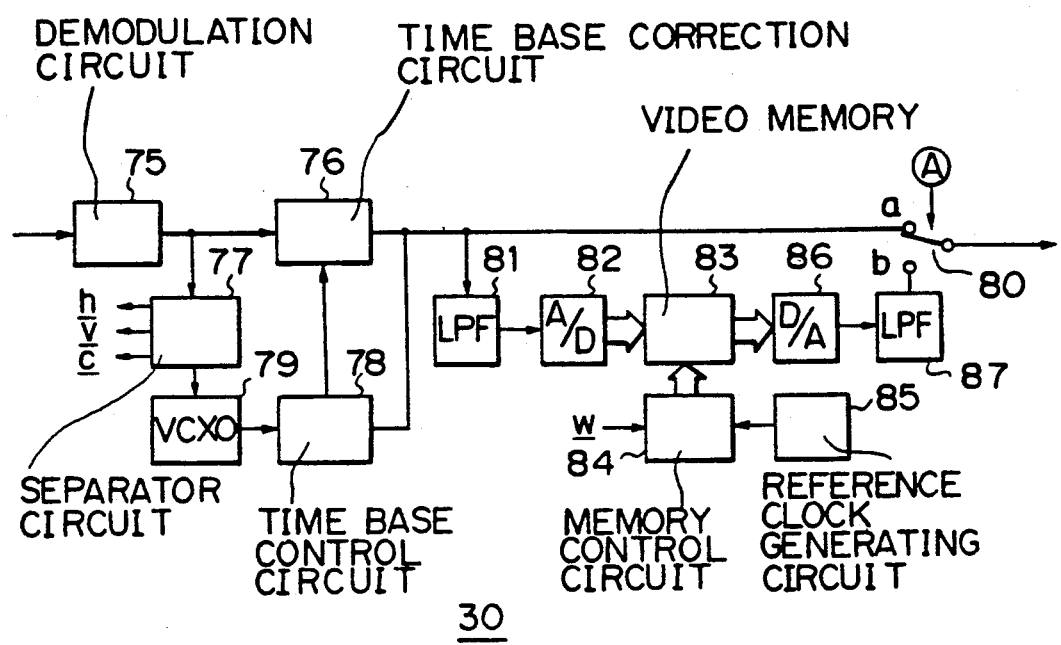
FIG. 11 is a block diagram showing a specific configuration of video format signal processing circuit 30 in the apparatus shown in FIGS. 6A through 6C.

FIG. 11 is a block diagram showing a specific circuit construction of the video format signal demodulating and processing circuit 30. As shown, the RF signal from the RF amplifier 26 is demodulated at a demodulation circuit 75, then supplied to a time base correction circuit 76 and to a separator circuit 77. In the separator circuit 77, the horizontal sync signal h, the vertical sync signal v and the control data c which are contained in the video format signal are extracted. The time base correction circuit 76 consists of, for example, a variable delay element of e.g. CCD (charge coupled device) and configured to vary the delay amount of that element in accordance with a control signal from a time base control circuit 78. The time base control circuit 78 is configured to output as the control signal a signal corresponding to a phase difference between an oscillation signal and its divided signal of a crystal oscillator (VCO) 79 which oscillates, for example, in synchronism with the horizontal sync signal h extracted at the separator circuit 77, and the horizontal sync signal and the color burst signal of the video signal transmitted through the time base correction circuit 76. For more specific configuration, reference is directed for example to Japanese patent application laid-open number P56-102182.

The video signal having been processed by the time base correction operation is used as one input of a selector switch 80, and also supplied to an A/D converter 82 through an LPF (Low Pass Filter) 81. In the A/D converter 82, the sampling of the video signal is performed at intervals of a predetermined period, and the thus obtained sampled values are in turn converted to digital data. The output data of the A/D converter 82 is supplied to a video memory 83 consisting of a RAM (random access memory) and so on. A memory having a capacity for storing video information of at least one field long is used as the video memory 83. Address and mode controls of this video memory 83 are performed by a memory control circuit 84. The memory control circuit 84 is configured to perform control operations for sequentially read-out data written in each address of the video memory 83 in accordance with a clock from a reference clock generating circuit 85, and for rewriting the contents of each address of the video memory 83 in response to a write enable signal w which is outputted from the system controller 32. The data read-out from the video memory 83 is converted to an analog signal in a D/A (digital to analog) converter 86, and supplied through an LPF 87 as the other input to the selector switch 80. The selector switch 80 is normally held at a position a to selectively output the video format signal directly supplied from the time base correction circuit 76, and switched to a position b in response to a changeover command from the system controller 32, to selectively output the video format signal having been processed through the video memory 83.

Operations of the processor in the system controller 32 in the above configuration will be specifically explained with reference to the flowchart of FIG. 13.

It is assumed that a composite disc is set in a playback position. When a start command is issued in this state, the processor transmits a drive command to the motor driving circuit 71, so that the slider motor 24 is driven to move the pickup 22 to an innermost peripheral position (step S1). If it is detected that the pickup 22 has reached the innermost peripheral position by means of a detector switch of any usual configuration (not shown), the processor executes a focusing operation of the pickup 22, and performs the read-in of index code information which is recorded in an audio lead-in area at an innermost peripheral area of the disc (step S2). Subsequently, the processor judges whether or not the disc being set is a composite disc or not, on the basis of the read information (step S3). If it is judged that the disc being set is a compact disc, then the execution directly proceeds to a CD playback mode (step S4) and a playback operation is continuously performed unless any command for the programmed music selecting operation for example has been issued. Since the playback operation in the CD playback mode itself is well known, the explanation thereof is omitted here.

If it is judged in step S3 that the disc being set is a composite disc, the processor immediately accelerates the slider motor 21 to a maximum rated speed of rotation for the video area (step S5). At the same time, the processor moves the pickup 22 toward the outer periphery of disc at a high speed by driving the slider motor 24 at a high speed (step S6). After these operations, when it is detected that the pickup 22 has reached the video area by the detection signal from the position detector 70 (step S7), the processor starts the playback operation of the video area (step S8). During video area playback, the processor performs the control operation for writing the video information of at least one field (or one frame) long obtained from the disc in the video memory 83. This video information to be written may be, for example, first information in the video area, or it can be designated by an address designation through the key operation of the operation part 60.

If it is detected that the playback of the video area has been completed, in step S9, then the processor decelerates the spindle motor 21 to the maximum rated speed of rotation for the CD area (step S10). At the same time, the processor drives the slider motor 24 at a high speed, to move the pickup 22 to the innermost peripheral position of the disc at a high speed (step S11). If it is detected (step S12) that the pickup 22 has reached the innermost peripheral position by the detection output signal of the above mentioned detector switch (not illustrated), the processor starts playback operation of the CD area (step S13). Concurrently to this, the selector switch 80 in the video format signal demodulating and processing circuit 30 is changed over by the processor to the position b thereby selecting and outputting the video information which was written in the video memory 83 during video area playback. Thus, playback of a still picture is performed during CD area playback. When the completion of the CD area playback is detected by reading the information of audio lead-out (step S14), the processor initiates the driving of the slider motor 24 to move the pickup 22 to its home position (step S15) unless any operational command is present. Furthermore, a loading mechanism (not shown in the drawings) performs disc ejection (step S16), to complete the playback operating sequence.

By an interruption caused by the timer and so on, during the execution of the main routine, the processor proceeds to step S20, in which it judges as to whether or not the search operation is commanded by a key operation in the operation part 60, as illustrated in FIG. 13. If it is judged in step S20 that the search operation is commanded, then the processor starts the search operation (step S21). When the completion of the search operation is sensed by determining whether the difference between a target address and the address being read has become smaller than a predetermined value (step S22), the processor restarts the execution of the routine which was being executed immediately before proceeding to the step S20. If it is judged in step S20 that the search operation is not commanded, the processor then judges as to whether the execution of a special reproduction operation such as the double speed reproduction, scanning reproduction in which information recorded on the disc is reproduced in an order different from the order of recording by the track jump operation of the information reading point of the pickup 22, is commanded (step S23). The track jump operation is performed by driving the tracking actuator in the pickup 22, or driving the slider 23.

If it is judged in step S23 that the execution of the special reproduction operation is commanded, the processor then judges as to whether or not the graphic code detection signal is outputted from the graphic code detection circuit 90 (step S24). If it is judged in step S24 that the graphic code detection signal is outputted, the processor restarts the execution of the routine which was being executed immediately before proceeding to the step S20. If, on the other hand, it is judged in step S24 that the graphic code detection signal is not outputted, the processor executes the designated special reproduction operation (step S25) until when the stop of the special reproduction operation is commanded by a key operation in the operation part (step S26). Then the processor restarts the execution of the routine which was being executed immediately before proceeding to the step S20.

In the operating sequence described above, the reproduction of the information recorded in the CD area of the composite disc is performed in steps S10 through S14 after the playback of information recorded in the video area in steps S1 through S9.

When the "load CLUT color 0 through color 7" instructions and the "load CLUT color 8 through color 15" instructions are decoded by the mode/instruction decoder 53 during video area playback, data of designated 16 colors among 4096 colors are held in the CLUT 58.

Subsequently, by the decoding of the "write font foreground/background" instruction etc., picture data of 16 channels are in turn stored in the RAM 56a through 56p in the picture memory device 55. When one of the picture data of 16 channels is designated by data corresponding to the key operation in the operation part 60, picture data of the designated channel is sequentially outputted from the picture memory device 55, and in turn supplied to the CLUT 58. By this operation, color data of a color number indicated by the picture data is then outputted from the CLUT 58. A video format signal based on this color data is outputted from the analog video converting circuit 65, and supplied to the video switch 33.

Figure 14:
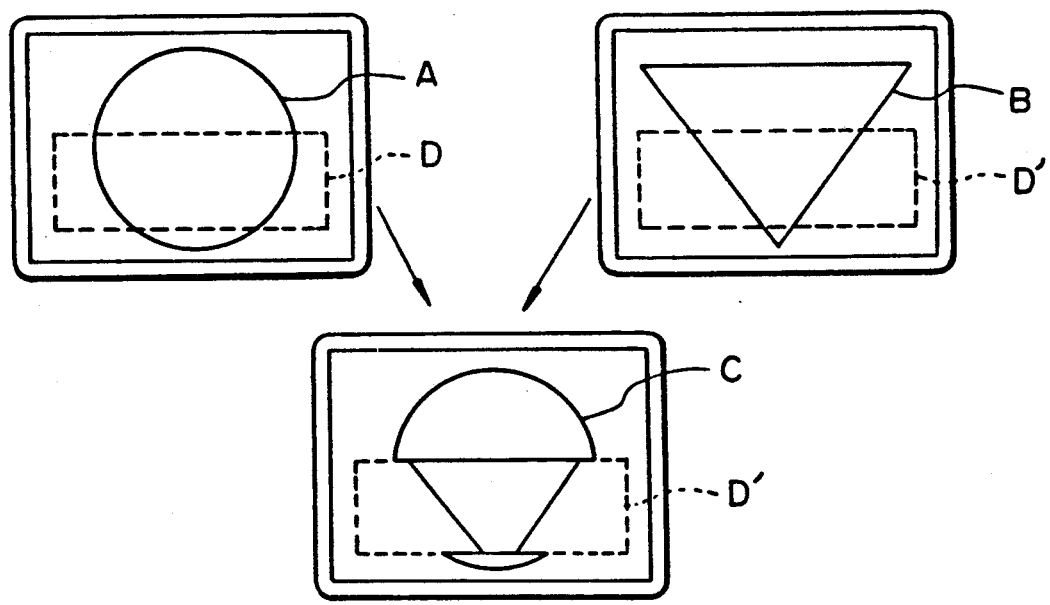
FIGS. 14 and 15A through 15C are diagrams showing pictures obtained by the apparatus shown in FIGS. 6A through 6C.
Figure 12:
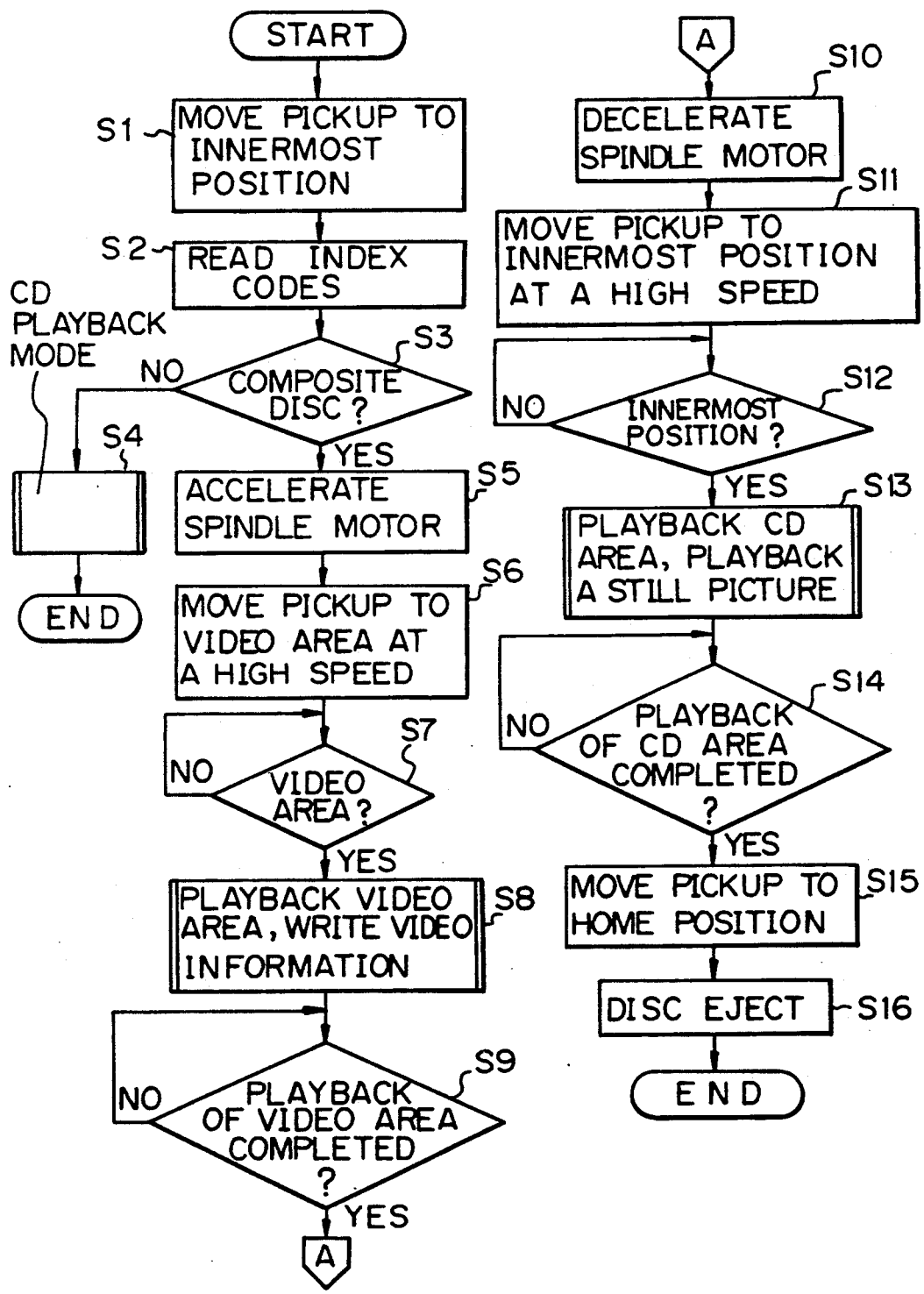

If the "load TCT" instruction is decoded in this state, the transparency control bits TCB-0 through TCB-15 respectively corresponding to each color number are then held in the TCT 66. Among the TCB-0 through TCB-15 being held, one corresponding to the color number indicated by the data read-out from the picture memory device 55 is selectively outputted from the TCT 66, and the mixing ratio in the video switch 33 is designated by the output of the TCT 66. Thus, the mixing ratio between the video format signal outputted from the analog-to-video converting circuit 65 and the video format signal outputted from the video format signal demodulating and processing circuit 30 is controlled for each pixel. Consequently, a combination of pictures such as illustrated in FIG. 14 is made possible. Specifically, the mixing ratio is set to 100% for a portion corresponding to each pixel outside a region D of a picture A based on the video format signal outputted from the video format signal demodulating and processing circuit 30, and set to 0% for a portion corresponding to each pixel within the region D. On the other hand, the mixing ratio is set to 0% for a portion corresponding to each pixel outside a region D' of a picture B based on the video format signal outputted from the analog-to-video converting circuit 65, and set to 100% for a portion corresponding to each pixel within the region D' of the picture B. Then a picture C can be formed by combining the portion of the picture A outside the region D and the portion of the picture B within the region D'.

Figure 15A:
Figure 15B:
Figure 15C:

In this way, it is possible to compose a picture as illustrated in FIGS. 15A through 15C, in which a caption (a translation of a dialogue), a musical score, or an explanation of a scene, etc., obtained from the subcode is inserted into a moving picture obtained by the video format signal recorded in the video area or a still picture obtained by the signal from the video memory 83.

Of course, only the picture by the subcode can be obtained if the mixing ratio of the video format signal outputted from the analog-to-video converting circuit 65 is set at 100% for the whole picture area.

In addition, when execution of the special reproduction operation is commanded by the key operation in the operation part 60, whether or not the graphic code detection signal is being outputted is judged in the step S24, and the special reproduction operation is inhibited when the graphic code detection signal is being outputted, that is, when picture information is recorded as the subcode. Therefore, it is possible to prevent the picture by the subcode from being disturbed by the track jump operation of the information reading point of the pickup 22 which would be generated by commanding the execution of the special reproduction operation while the reading of a series of graphic codes which constitute the image of a picture.

In the above embodiment, the special reproduction operation is inhibited by the operation of the step S24 in the program executed by the system controller 32. However, it is also possible to adapt the apparatus such that the code commanding the special reproduction operation is not issued from the operation part 60 upon presence of the graphic code detection signal.

In addition, in the embodiment described above, the recording medium on which the subcode carrying picture information is recorded is a composite disc generally designated as the CDV. However, it is of course possible to use, as the recording medium on which the subcode carrying the picture information is to be recorded, other type of recording medium such as a disc designated as LDD, i.e., a disc on which an FM-modulated video format signal, an audio signal, and a digital audio signal are record by multiplexing, by using a frequency multiplexing system, and so on.

As specifically described in the foregoing, according to the present invention, in the recording medium playing apparatus according to the first feature of the invention, a graphic code detection signal is generated when the graphic code is detected from the read signal from the pickup for reading information on the recording medium, and the special reproduction operation is inhibited upon presence of the graphic code detection signal. Therefore, even if the execution of the special reproduction operation is commanded while the reading of a series of graphic codes constituting the image of one picture, the special reproduction operation will not be performed, and the generation of disturbance in the picture by the subcode is prevented since the track jump of the information reading point of the pickup does not occur under such a condition.

Referring to FIGS. 16A through 16C, FIG. 17 and FIG. 18, the second embodiment of the present invention will be explained.

Figure 6B:
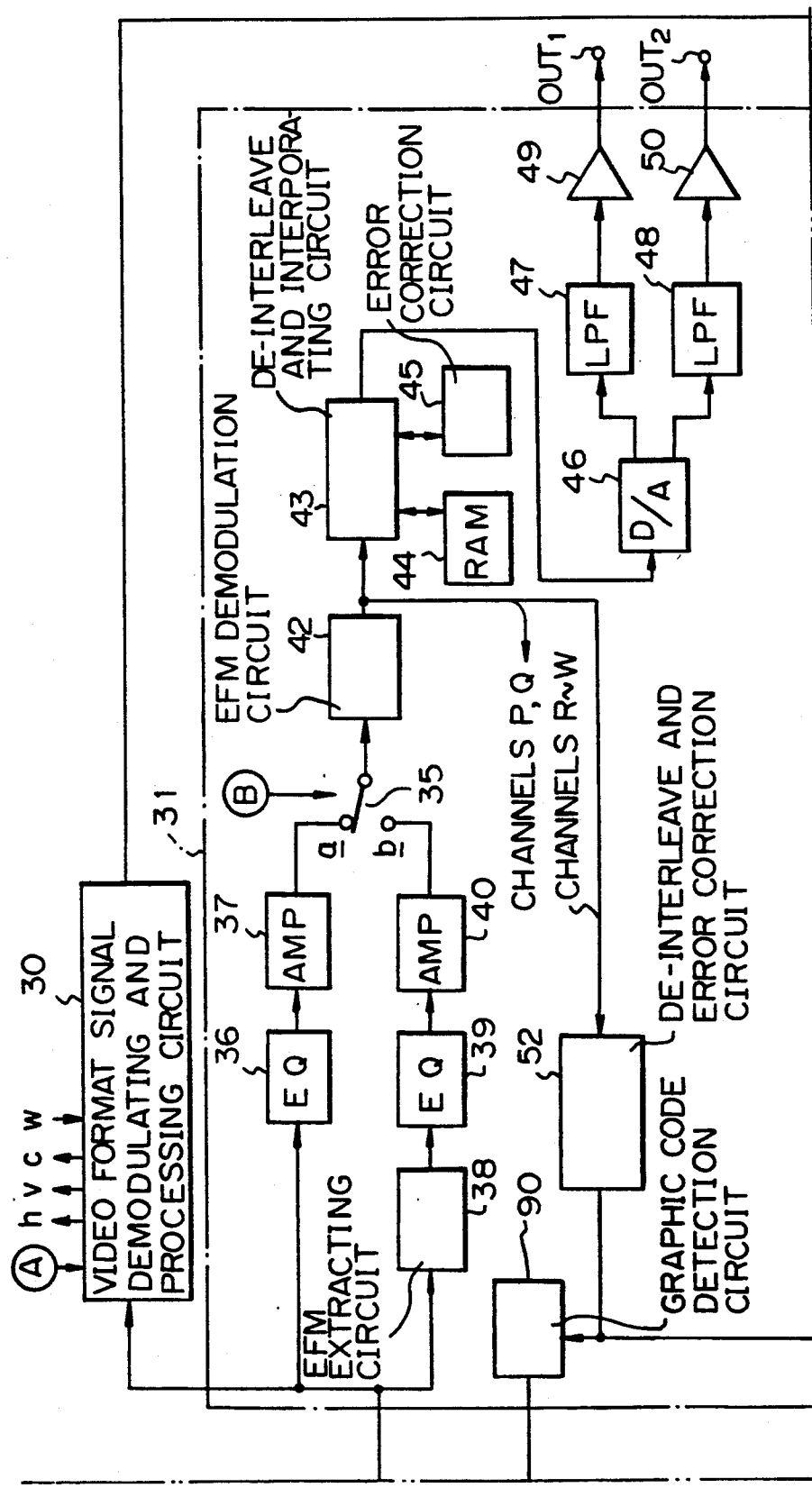
Figure 6C:
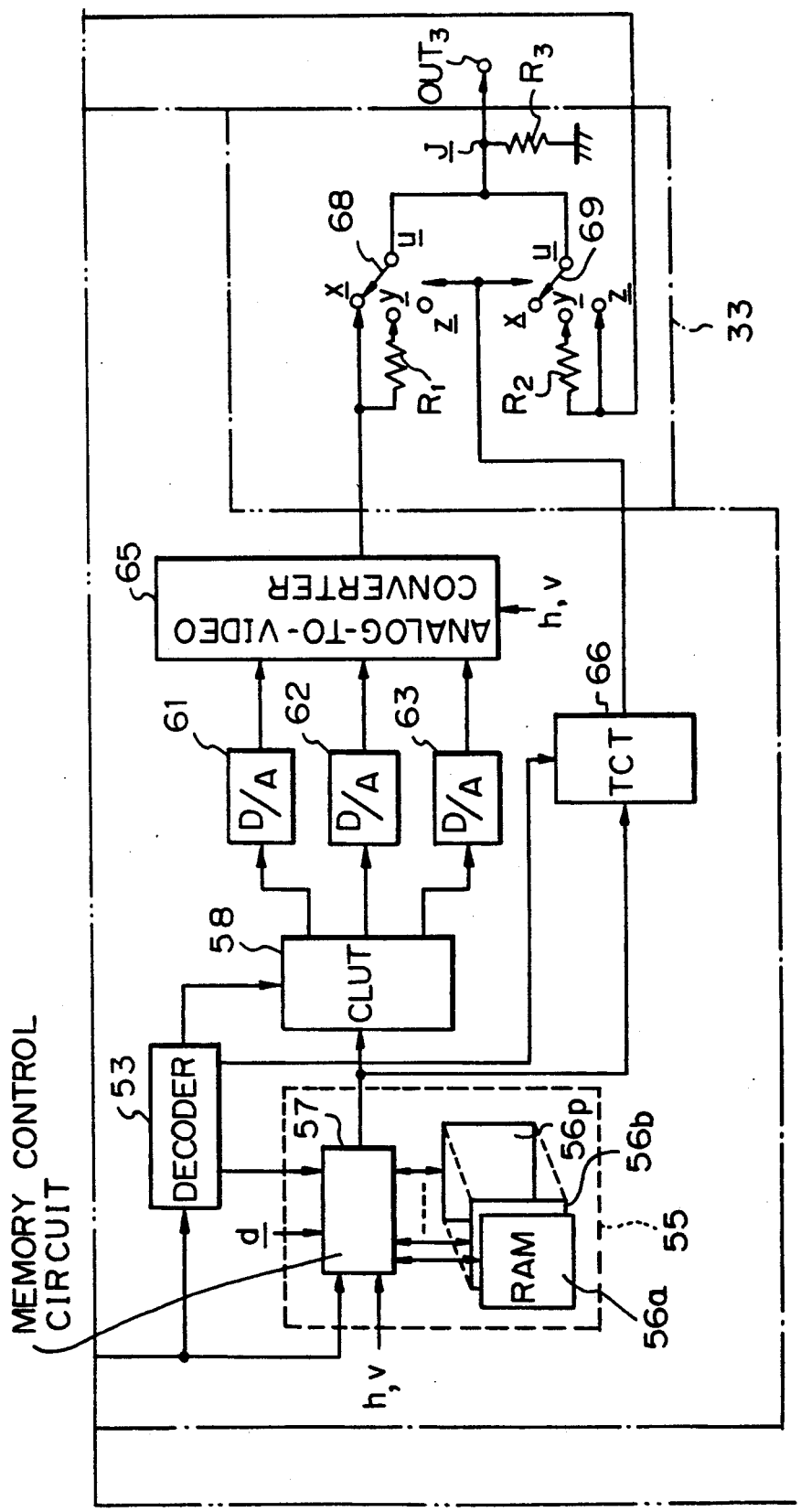
Figure 16B:
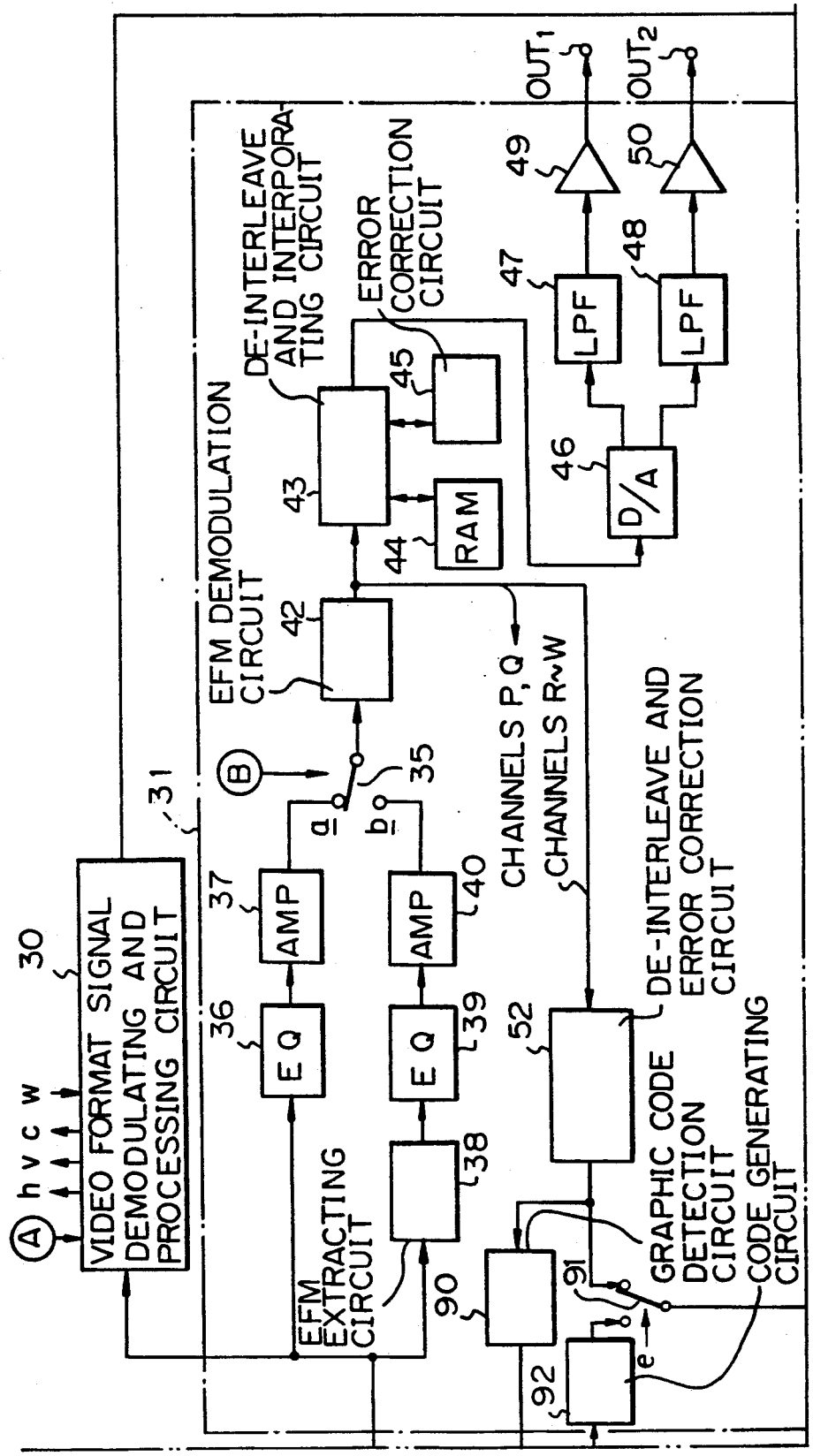
Figure 16C:
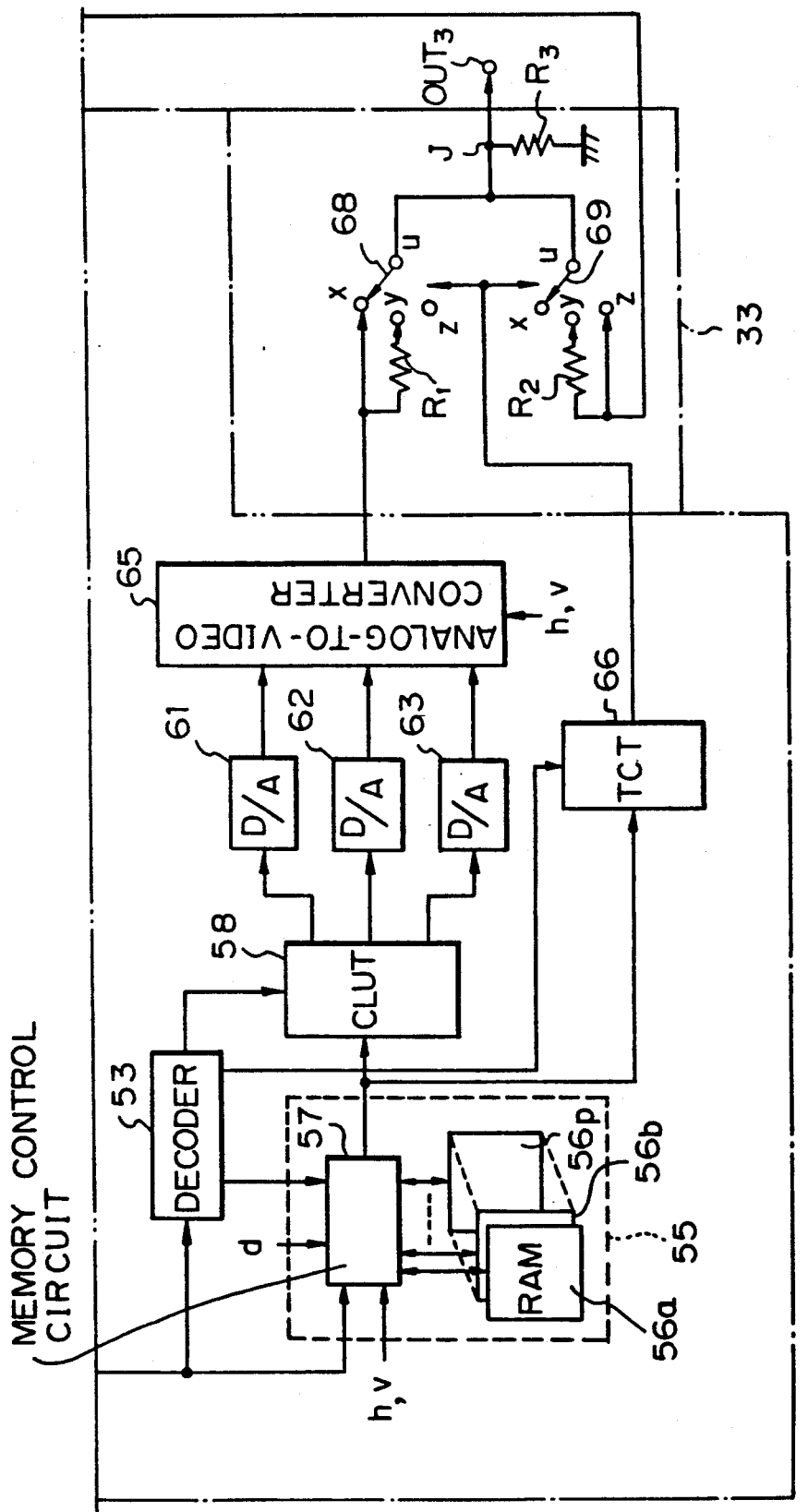

FIGS. 16A through 16C show a disc player as the second embodiment of the present invention. In these figures, the disc player is constructed generally the same as the disc player shown in FIGS. 6A through 6C, and the mutual connection is the same for various parts, i.e., the spindle motor 21 for driving the disc 20, pickup 22, slider 23, slider motor 24, transmission mechanism 25, RF amplifier 26, video format signal demodulating and processing circuit 30, coded information signal demodulating and processing circuit 31', system controller 32, video switch 33, operation part 60, position detector 70, motor driving circuit 71, and display part 72.

In the disc player system of this example, however, the coded information signal demodulating and processing circuit 31 includes a changeover switch 91 and a code generating circuit 92.

The output data of the de-interleave and error correction circuit 52 is supplied to the graphic code detection circuit 90 and to one of two input terminals of the changeover switch 91. The output signal of the code generating circuit 92 is supplied to the other one of the input terminals of the changeover switch 91. The code generating circuit 92 is configured to generate, in response to a code output command from the system controller 32, for example, an instruction code designated as "preset memory" having such a structure as shown in FIG. 17, i.e., an instruction for setting the color of all fonts in the picture to be the color designated by four bits of channels T through W of the symbol 4. On the other hand, the changeover switch 91 is configured to selectively output the output signal of the de-interleave and error correction circuit 52 when a changeover command signal e outputted from the system controller 32 is not present, and to selectively output the output signal of the code generation circuit 92 when the changeover command signal e is present. A memory protection means is constituted by the changeover switch 91 and the code generating circuit 92.

The output data of the changeover switch 91 is supplied to the mode/instruction decoder 53. The output data of the changeover switch 91 is also supplied to the memory device 55.

Figure 18:
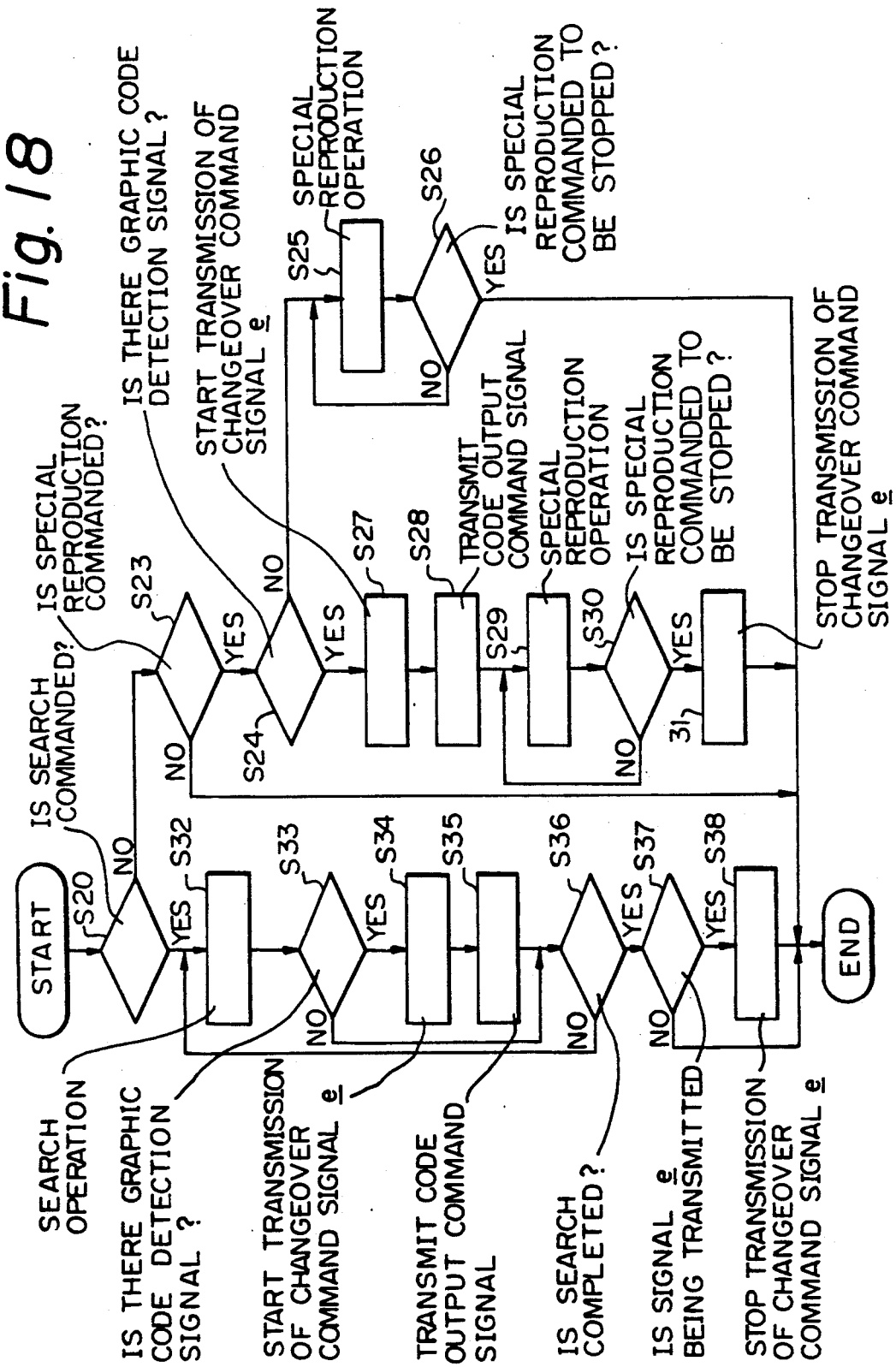
FIG. 18 is a flowchart showing the operation of processor in the system controller 32 of the apparatus shown in FIGS. 16A through 16C.

Referring to the flowchart of FIG. 18, the operation of the system controller 32 in the above-described construction will be explained. The system controller performs the operations of the steps S1 through S16 shown in the flowchart of FIG. 12. Furthermore, in the flowchart of FIG. 18, the operations in the step S20 and steps S23 through S26 are the same as those shown in FIG. 13. Therefore, the explanation of those steps will not be repeated.

If it is judged in step S24 that the graphic code detection signal is being outputted, the processor starts the transmission of a changeover command signal e to the changeover switch 91 (step S27), and then transmits a code output command signal to the code generating circuit 92. Then, the processor performs the commanded special reproduction operation (step S29) until a stop command is issued by a key operation in the operation part 60 (step S30). If the stop command is issued, the processor stops the transmission of the changeover command signal e (step S31) and restarts the execution of the routine which was being executed immediately before proceeding to the step S20.

If it is judged in step S20 that the execution of the search operation is commanded, the processor starts the search operation (step S32), and judges as to whether or not the graphic code detection signal is being outputted from the graphic code detection circuit 90 (step S33). If it is judged in step S33 that the graphic code detection signal is being outputted, then the processor starts the transmission of the changeover command signal e to the changeover switch 91 (step S34), and transmits the code output command signal to the code generating circuit 92. Then the processor senses the completion of the search operation by determining whether or not the difference between the target address and the address being read becomes smaller than a predetermined value. If it is detected in step S33 that the graphic code detection signal is not being outputted, the processor immediately proceeds to the step S36.

In the event that the completion of the search operation is not sensed in step S36, the processor proceeds to the step S32 once more. If, on the other hand, the completion of the search operation is sensed in step S26, the processor stops the transmission of the changeover command signal e when the changeover command signal e has been transmitted (steps S37, S38). If the changeover command signal e has not been transmitted, the processor restarts the execution of the routine which was being executed immediately before proceeding to the step S20 (steps S37, S38).

Thus, when the special reproduction operation is commanded by the key operation in the operation part, whether or not the graphic code detection signal is being outputted is judged in step S24, and the apparatus is placed in a state that the output signal of the code generating circuit 92 is selectively outputted from the changeover switch 91 in step S27 if the graphic code detection signal is being outputted, i.e., if picture information is recorded as the subcode. Subsequently, in step S28, the instruction code called "preset memory" is outputted from the code generating circuit 92. As a result, the designated one sort of color number is written into the rams 56a through 56p in the memory device 55, so that the whole area of the picture becomes a single color. Since the special reproduction operation is performed after these operations, the picture produced from the subcode is prevented from being disturbed by the track jump of the information reading point of the pickup 22 even if the special reproduction operation is commanded while the series of graphic codes constituting the image of one picture are being read.

If the graphic code is detected in steps S33 through S35 while the search operation is being performed, a designated one sort of color number is written in the rams 56a through 56p in the picture memory device 55 so that the picture on the whole becomes a single color. Therefore, the generation of disturbance in the picture by the subcode can be prevented.

In the embodiment described above, the instruction code named "preset memory" is issued from the code generating circuit 92. However, it is also possible to adapt the apparatus such that the write font instruction code corresponding to a predetermined image is outputted from the code generating circuit 92, so that the predetermined image is displayed. In addition, it is also possible to arrange the apparatus simply such that the code generating circuit 92 is eliminated, and the output signal of the de-interleave and error correction circuit 52 is not supplied to the mode/instruction decoder 53 during the special reproduction operation, so that the picture immediately before the start of the special reproduction is maintained.

Furthermore, in the embodiment described above, one of the output signal of the code generating circuit 92 and the output signal of the de-interleave and error correction circuit 52 is selectively supplied to the memory controller 57 by means of the changeover switch 91. However, it is also possible to adapt the apparatus such that the output signal of the code generating circuit 92 is directly supplied to the memory control circuit 57 without passing through the changeover switch 91, and adapt the memory controller 57 such that it selectively writes one of the output signal of the code generating circuit 92 and the output signal of the de-interleave and error correction circuit 52 to the ram 56a through 56p in response to a command from the system controller.

In addition, in the embodiment described above, the recording medium on which the subcode carrying picture information is recorded is a composite disc generally designated as the CDV. However, it is of course also possible to use in this embodiment, as the recording medium on which the subcode carrying the picture information is to be recorded, other type of recording medium such as a disc designated as LDD, i.e., a disc on which an FM-modulated video format signal, an audio signal, and a digital audio signal are record by multiplexing, by using a frequency multiplexing system, and so on.

As described in the foregoing, in the recording medium playing apparatus according to the second feature of the present invention, a graphic code detection signal is generated when a graphic code is detected from the read signal of the pickup for reading information recorded on the recording medium, the contents of the memory, into which the graphic codes in the read signal of the pickup is to be written, are protected as being maintained at a state independent on the read signal if the graphic code detection signal is present at the time of starting of the special reproduction operation, and a picture signal corresponding to graphic codes read out from the memory is produced. Therefore, even if the execution of the special reproduction operation is commanded while the reading of a series of graphic codes constituting the image of a picture is being executed and the track jump of the information reading point of the pickup is performed, the stored contents of the memory are protected as being held at the predetermined state immediately before the execution of the special reproduction operation. Thus, the generation of disturbance in pictures produced from the graphic codes can be surely prevented.

A variation of the embodiment of the recording medium playing apparatus according to the present invention will be described with reference to FIGS. 19A through 19C, and FIG. 20.

Figure 19A:
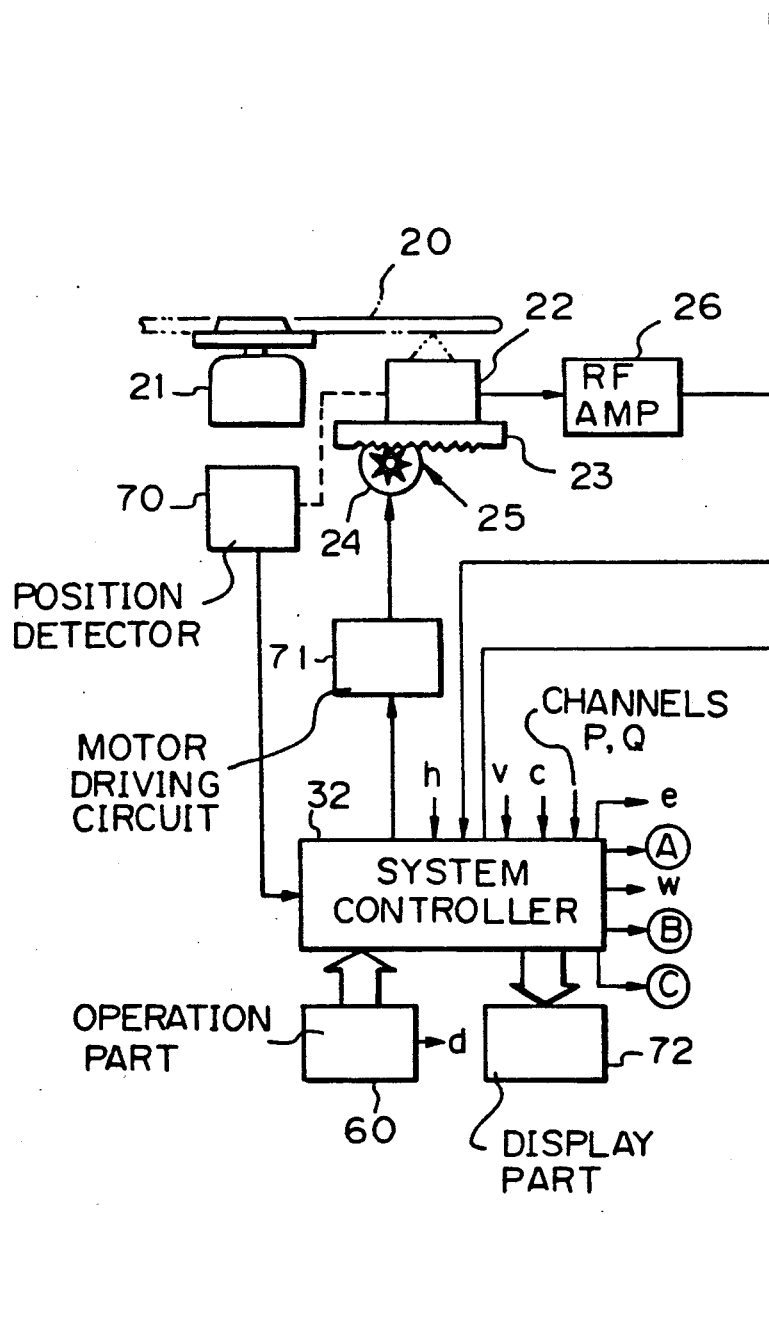
Figure 19C:
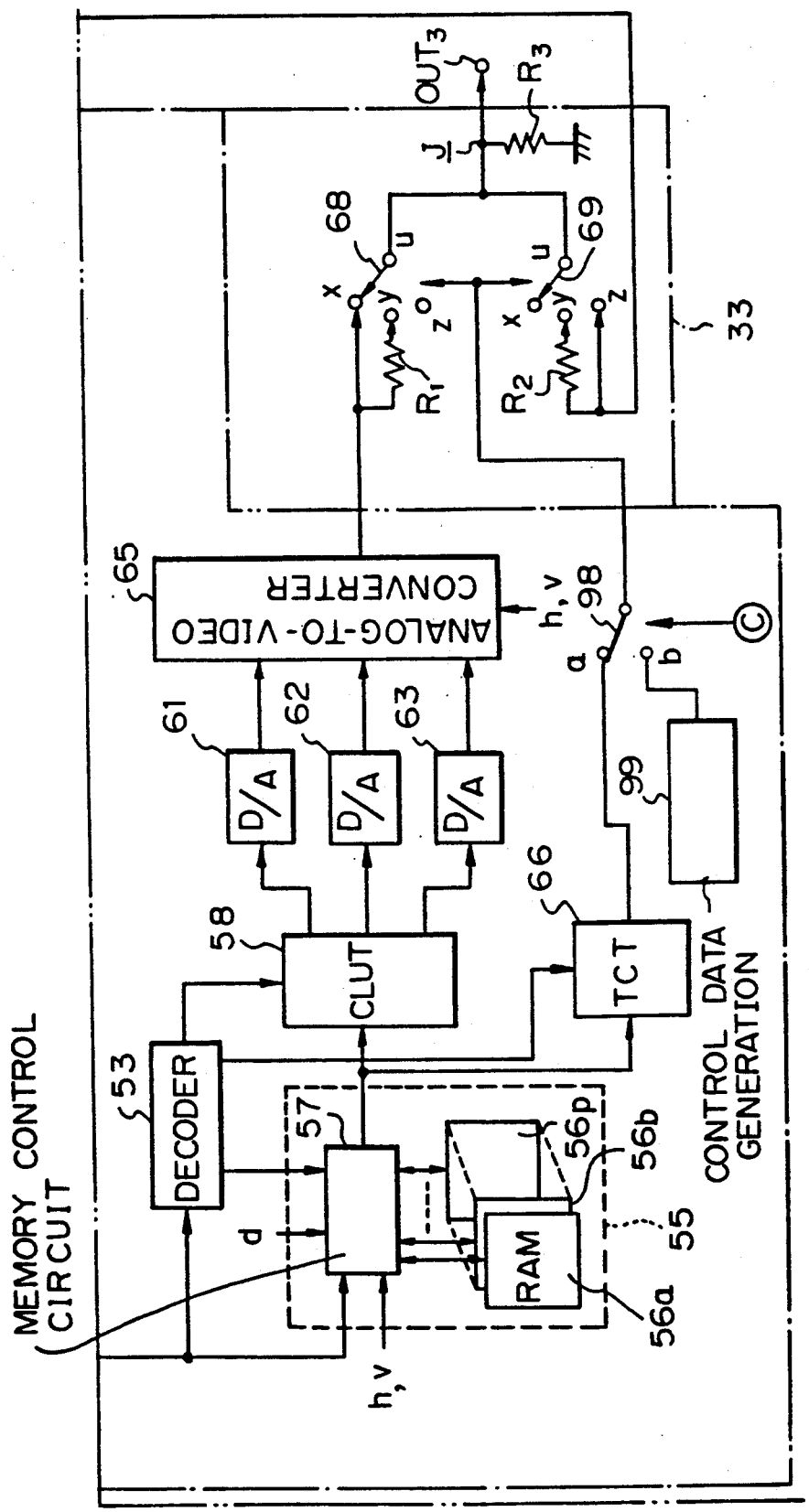

In this variation, the output signal of the TCT 66 is supplied to a selector switch 98 as illustrated in FIG. 19C. The selector switch 98 also receives, at its other input terminal, an output signal of a control data generation circuit 99. The apparatus is constructed such that the selector switch 98 is normally operated at its switch position a in which the output signal of the TCT 66 is selectively transmitted, and it selectively transmits the output signal of the control data generation circuit 99 when operated to its switch position b in response to a switch command (c) supplied from the system controller 32.

On the other hand, the control data generation circuit 99 is constructed to always generate data for controlling the changeover switches 68 and 69 so that their movable contacts u, u contact with the stationary contacts z, z. Therefore, when the selector switch 98 is operated to its switch position b in response to the switch command issued from the system controller 32, only the video format signal outputted by the video format signal processing circuit 30 is derived at the common junction J, so that mixing of the video format signal according to the graphic codes recorded as the subcode does not take place.

Furthermore, the operation part 60 shown in FIG. 19A is provided with a manual switch for selecting as to whether or not images (or pictures) according to the graphic codes are to be displayed. When this manual switch is operated to its "on" position by a user of the apparatus, the display of images according to the graphic codes is performed if the graphic codes are included in the information recorded on the recording medium. On the other hand, when the manual switch is operated to its "off" position, the display of images according to the graphic codes is not performed even if the graphic codes are included in the recorded information.

The operation of the processor in the system controller 32 of the apparatus having the construction described above will be explained with reference to the flowchart shown in FIG. 20. The operation of each step in this flowchart is the same as the operation of the corresponding step in the flowchart shown in FIG. 13 except the points described below. As shown, in the case of this variation the processor proceeds, after the step S23, to a step S231 for detecting as to whether or not the manual switch is operated at the "on" position. In the step S231, the switch position of the manual switch is judged by means of a signal from the operation part 60. If it is detected that the manual switch is operated at the "on" position, the processor proceeds to the step S24 in which whether or not the graphic code detection signal is outputted from the graphic code detection circuit 90 is judged. Conversely, if it is detected in step S231 that the manual switch is operated at the "off" position, the processor changes the switch position of the selector switch 98 to the position b, so that the insertion of images according to the graphic codes is stopped (step S232), and subsequently the processor proceeds to the step S25 to perform the special reproduction operation.

By the operation of the system controller 32 described above, the special reproduction operation is performed only when the graphic code detection signal is not produced in the case where the reproduction of images according to the graphic codes is designated by the operation of the manual switch by the user of the apparatus. On the other hand, in the case where the reproduction of images according to the graphic codes is not designated, the system controller 32 operates the selector switch 98 to the position b so as to suspend the reproduction of images according to the graphic codes, and subsequently performs the special reproduction operation.

Figure 21B:
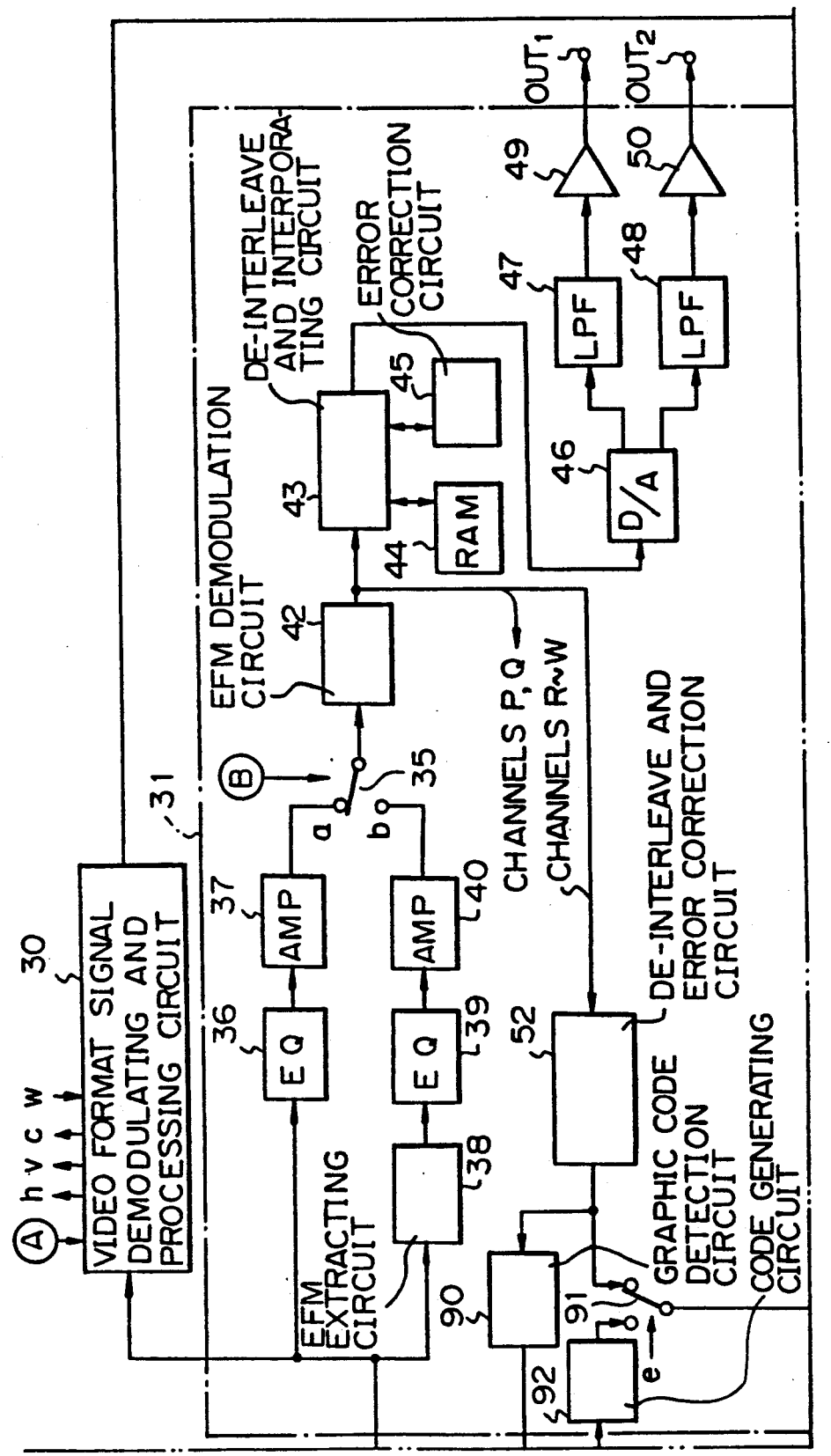
Figure 21C:
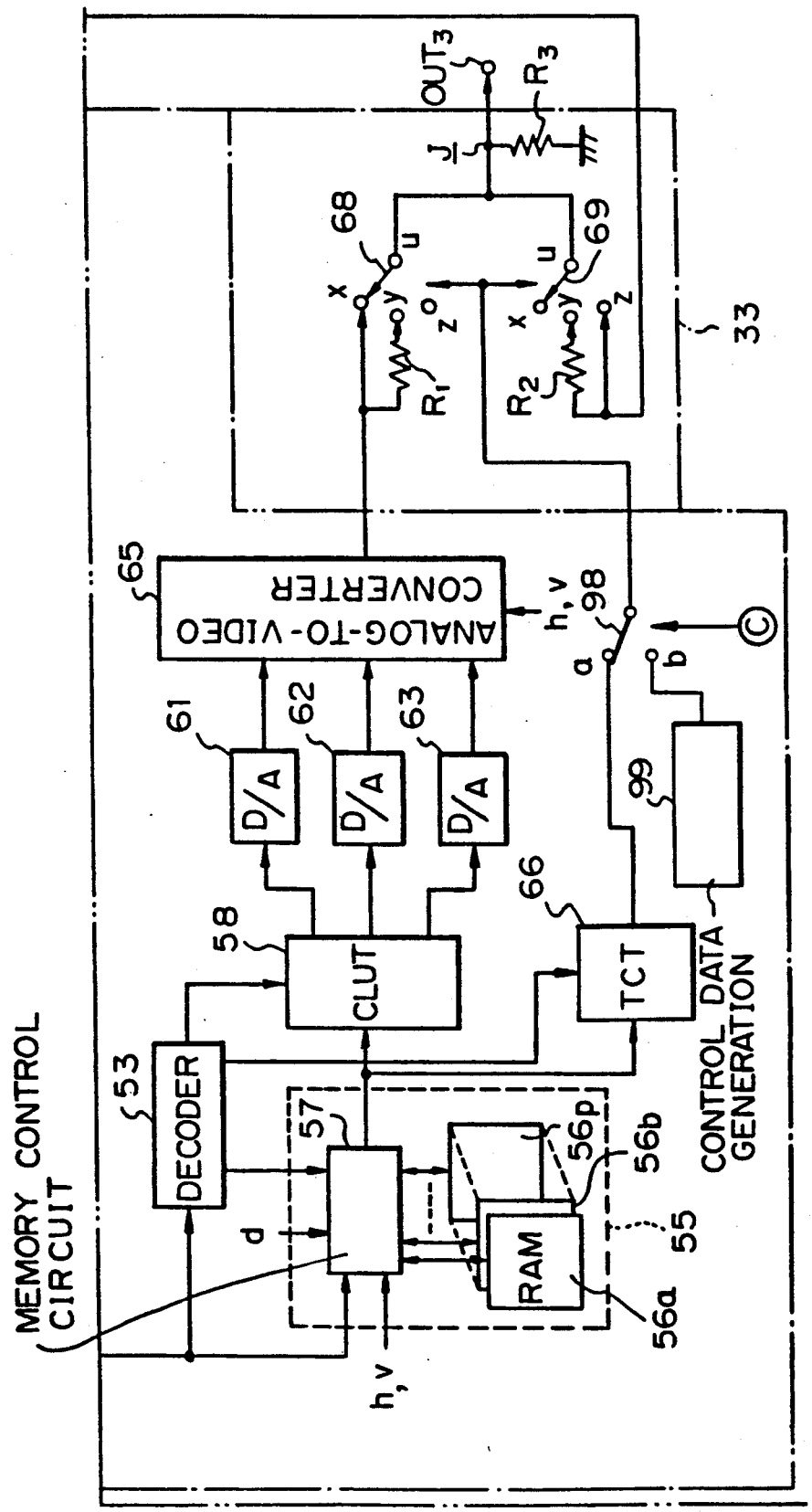

The above-described variation is also applicable to the embodiment of the present invention shown in FIGS. 16A through 16C. Specifically, as in the above-described case, the apparatus can be constructed such that a selector switch 98 and a code data generation circuit 99 are inserted in the signal line between the TCT 66 and the changeover switches 68 and 69, and the selector switch 98 is operated by the system controller 32 as illustrated in FIGS. 21A through 21C.

The control operation of the system controller 32 in this case is illustrated in the flowchart of FIG. 22. The operation of each step in this flowchart is the same as the operation of the corresponding step in the flowchart shown in FIG. 18 except the points described below. As shown, a step S231 for detecting as to whether or not the manual switch is operated at the "on" position is provided after the step S23. In the step S231, the processor judges the switch position of the manual switch by means of a signal from the operation part 60. If it is detected that the manual switch is operated at the "on" position, the processor proceeds to the step S24 in which whether or not the graphic code detection signal is outputted from the graphic code detection circuit 90 is judged. Conversely, if it is detected in step S231 that the manual switch is operated at the "off" position, the processor changes the switch position of the selector switch 98 to the position b, so that the insertion of images according to the graphic codes is stopped (step S232), and subsequently the processor proceeds to the step S25 to perform the special reproduction operation.

By the operation of the system controller 32 described above, whether or not the graphic code detection signal is being produced is detected, and the special reproduction operation is performed in accordance with the result of detection in the case where the reproduction of images according to the graphic codes is designated by the operation of the manual switch by the user of the apparatus. On the other hand, in the case where the reproduction of images according to the graphic codes is not designated, the system controller 32 operates the selector switch 98 to the position b so as to suspend the reproduction of images according to the graphic codes, and subsequently performs the special reproduction operation.

In the above-described variations, the step S231 for detecting the operating position of the manual switch is provided after the step S23 for determining whether or not the special reproduction command is generated. However, such an arrangement is not limitative and it is needless to mention that the operating position of the manual switch can be detected at other operating times of the system controller 32.

What is claimed is:

1. An apparatus for playing a recording medium on which, in addition to a coded information signal, graphic codes including picture information are recorded as being inserted as subcodes into said coded information signal, said apparatus comprising:

playing means including a pickup for reading information recorded on said recording medium and producing a read signal, said playing means being capable of performing a special reproduction operation for reproducing information recorded on said recording medium in an order different from a recording order by a track jump operation of an information reading point of said pickup;

graphic code detection means for detecting the presence of said graphic codes in said read signal of said pickup and generating a graphic code detection signal when said presence of said graphic codes is detected; and special reproduction operation inhibiting means for inhibiting said special reproduction operation of said playing means upon presence of said graphic code detection signal.

2. An apparatus as set forth in claim 1, and further comprising a manual switch for designating reproduction of images according to the graphic codes, said manual switch being connected to said playing means to control said playing means for reproduction of images according to said graphic codes when in one switch position and for enabling the special reproduction operation of said playing means when said manual switch is not in said one switch position.

3. An apparatus for playing a recording medium on which, in addition to a coded information signal, graphic codes including picture information are recorded as being inserted as subcodes into said coded information signal, said apparatus comprising:

playing means including a pickup for reading information recorded on said recording medium and producing a read signal, said playing means being capable of performing a special reproduction operation for reproducing information recorded on said recording medium in an order different from a recording order by a track jump operation of an information reading point of said pickup;

a memory;

memory control means for performing control operations for writing graphic codes in said read signal into said memory and reading contents stored in said memory;

graphic code detection means for detecting the presence of said graphic codes in said read signal of said pickup and generating a graphic code detection signal when said presence of said graphic codes is detected; and memory protecting means for protecting said contents stored in said memory by placing said contents in a state independent from said read signal when said graphic code detection signal is present upon starting said special reproduction operation, wherein said playing means generates a picture signal corresponding to graphic codes read out from said memory.

4. An apparatus as set forth in claim 3, and further comprising a manual switch for designating reproduction of images according to the graphic codes, said manual switch being connected to said playing means to control said playing means for reproduction of images according to said graphic codes when in one switch position and for enabling the special reproduction operation of said playing means when said manual switch is not in said one switch position.

* * * * *